US006554384B1

(12) United States Patent
Tanaka

(10) Patent No.: US 6,554,384 B1
(45) Date of Patent: Apr. 29, 2003

(54) INK JET RECORDING APPARATUS AND INK JET RECORDING METHOD

(75) Inventor: Hideki Tanaka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/629,973

(22) Filed: Jul. 31, 2000

Related U.S. Application Data

(62) Division of application No. 08/476,325, filed on Jun. 7, 1995, now Pat. No. 6,120,123, which is a division of application No. 07/894,555, filed on Jun. 5, 1992, now Pat. No. 6,012,796.

(30) Foreign Application Priority Data

Jun. 7, 1991 (JP) .............................. 3-136608
Mar. 30, 1992 (JP) .............................. 4-074209
Apr. 1, 1992 (JP) .............................. 4-079858
May 29, 1992 (JP) .............................. 4-139176

(51) Int. Cl.[7] .............................................. B41J 2/205
(52) U.S. Cl. ............................. 347/15; 347/41; 347/43
(58) Field of Search .............................. 347/15, 41, 43, 347/12, 40

(56) References Cited

U.S. PATENT DOCUMENTS

| 4,313,124 A |   | 1/1982  | Hara ............................. 347/56 |
| 4,345,262 A |   | 8/1982  | Shirato et al. ................. 347/10 |
| 4,459,600 A |   | 7/1984  | Sato et al. ..................... 347/47 |
| 4,463,359 A |   | 7/1984  | Ayata et al. .................... 347/56 |
| 4,540,996 A |   | 9/1985  | Saito ............................ 347/43 |
| 4,558,333 A |   | 12/1985 | Sugitani et al. ................ 347/65 |
| 4,608,577 A |   | 8/1986  | Hori ............................. 347/66 |
| 4,631,548 A |   | 12/1986 | Milbrandt ...................... 347/15 |
| 4,675,692 A | * | 6/1987  | Goshima et al. ................ 347/12 |
| 4,723,129 A |   | 2/1988  | Endo et al. .................... 347/56 |
| 4,740,796 A |   | 4/1988  | Endo et al. .................... 347/56 |
| 4,864,328 A | * | 9/1989  | Fischbeck ...................... 347/43 |
| 4,965,593 A |   | 10/1990 | Hickman ........................ 347/41 |
| 4,999,646 A | * | 3/1991  | Trask ........................... 347/41 |

FOREIGN PATENT DOCUMENTS

| DE | 2 251 657  | 5/1974  |
| DE | 3 317 079  | 11/1983 |
| EP | 0 076 948  | 4/1983  |
| EP | 0172592    | 2/1986  |
| EP | 0295105    | 12/1988 |
| JP | 54-56847   | 5/1979  |
| JP | 59-123670  | 7/1984  |
| JP | 59-138461  | 8/1984  |
| JP | 60-71260   | 4/1985  |

OTHER PUBLICATIONS

The Fifth Int'l Congress on Advances In Non–Impact Printing Technologies, Suzuki, et al., "Printing System for the Bubble Jet Full–Color Copying Machine", pp. 543–550, Nov. 12–17, 1989.

IBM Technical Disclosure Bulletin, J. Kitamura, "Draft Font Generation", vol. 27, No. 4B, p. 2504, Sep. 1984.

* cited by examiner

Primary Examiner—Lamson Nguyen
(74) Attorney, Agent, or Firm—Fitzpatrick, Cella, Harper & Scinto

(57) ABSTRACT

A gray scale level data of each pixel is obtained as data taking 5 levels between 0 and 4 corresponding to the number of ejections from 4 individual discharging portions by the pseudo-halftoning processing. The pointer directs sequentially the memories every time an ejection data is set in responsive to the 5 level data. As a result, in forming a plurality of pixels sequentially, 4 individual discharging portions are used sequentially. So far, it will be appreciated that even if ejection failures occur in either of a plurality of discharging portions of the ink jet recording head, relatively high-quality recorded images are obtained and the lifetime of the recording head can be increased.

17 Claims, 35 Drawing Sheets

| 901 | 902 | 903 | 904 | 905 | 906 | 907 | 908 | 909 | NUMBER OF TIMES FOR USING |
|---|---|---|---|---|---|---|---|---|---|
| 1 | 1 | 0 | 1 | 2 | 2 | 4 | 3 | 2 | |
| #100 801A | #100 801A | | #100 801A | #100 801A | #100 801A | #100 801A | #100 801A | #100 801A | 8 |
| | | | | #68 801B | #68 801B | #68 801B | #68 801B | #68 801B | 5 |
| | | | | | | #36 801C | #36 801C | | 2 |
| | | | | | | #4 801D | | | 1 |

FIG. 2
PRIOR ART

| | 301 | 302 | 303 | 304 | 305 | 306 | 307 | 308 | 309 | NUMBER OF TIMES FOR USING |
|---|---|---|---|---|---|---|---|---|---|---|
| | 1 | 1 | 0 | 1 | 2 | 2 | 4 | 3 | 2 | |
| | #100 801A | #68 801B | | #36 801C | #100 801A | #68 801B | #100 801A | #100 801A | | 4 |
| | | | | | #4 801D | #36 801C | #68 801B | #68 801B | #36 801C | 4 |
| | | | | | | | #36 801C | | | 4 |
| | | | | | | | #4 801D | #4 801D | #4 801D | 4 |

FIG. 12

| 701 | 702 | 703 | 704 | 705 | 706 | 707 | 708 | 709 | NUMBER OF TIMES FOR USING |
|---|---|---|---|---|---|---|---|---|---|
| 1 | 1 | 0 | 1 | 2 | 2 | 4 | 3 | 2 | |
| #74*1 401A | #10*1 401B | | #74*1 401A | #74*1 401A #10*1 401B | #74*1 401A #10*1 401B | #74*2 401A #10*2 401B | #74*1 401A #10*2 401B | #74*1 401A #10*1 401B | 8 8 |

INK JET RECORDING APPARATUS AND INK JET RECORDING METHOD

This application is a division of application Ser. No. 08/476,325, filed Jun. 7, 1995, now U.S. Pat. No. 6,120,123, issued Sep. 19, 2000, which was a division of application Ser. No. 07/894,555, filed Jun. 5, 1992, now U.S. Pat. No. 6,012,796, issued Jan. 11, 2000.

BACKGROUND OF THE INVENTION

1. Field of the Invention

The present invention relates to an ink jet recording apparatus and its recording method for recording an image with a recording head having a plurality of orifices.

2. Description of Prior Art

A multi-droplet method is a recording method in which a plurality of ink droplets ejected from a single orifice is projected substantially onto an identical position on the recording sheet to form a pixel, and the number of ejected ink droplets of the pixel is changed to express halftoning (gray-scale) of an recorded image. The multi-droplet method is an effective for expressing a halftoning, particularly in a recording system in which ink droplets are ejected by a bubble generated in an ink fluid by thermal energy, and in which it is difficult to change the size of each ink droplet to a large extent.

As a single pixel is formed by a plurality of ink droplets ejected from a single orifice in the multi-droplet recording method, in case that the amount of ejected ink droplets varies from orifice to orifice, a density level (gray level) in the recorded image cannot maintain to be uniform and the recorded image may contain strip-noises or shadings (or bandings).

In order to prevent those problems, in prior art recording head, the manufacturing process of the recording heads must be controlled precisely by a software-based system for reducing the variation of the amount of ejected ink droplets from orifice to orifice. As a result, there are many problems including that a manufacturing cost may increase.

To solve the problems described above, an assignee of the present invention proposed a recording method in which a single pixel is formed by a plurality of ink droplets ejected from a plurality of orifices. That is, in the proposed method, so-called a multi-scan recording method, each of ejections of ink droplets for forming a single pixel from each of a plurality of orifices is performed at respective scanning of a recording head. The method will be appreciated that the amount variation of ejected ink droplets can be distributed uniformly from orifice to orifice.

FIG. 1 is a schematic illustration illustrating the multi-scan recording method.

In FIG. 1, reference numeral 801 denotes a recording head having a plurality of orifices, in this case, the number of orifices is 128. The recording head 801 forms a recorded image by ejecting ink droplets during scanning thereof in the horizontal direction in the figure from left to right. 801A is a position of the first scanning of the recording head 801 in relative to a recording medium, and 801B, 801C and 801D are positions corresponding to the subsequent scannings of the recording head, respectively. Reference numeral 802 denotes a pixel. The number having a symbol # as its prefix is an identification number specific to each of 128 orifices. In the above structure, a density level of the specified pixel 802 at a pixel position (x, y) is expressed by selecting ejections and non-ejections from orifices No. 100, No. 68, No. 36 and No. 4 at each of four scannings 801A, 801B, 801C and 801D of the recording head 801. This means that, for example, if all the orifices do not eject ink droplets, the density level of the specified pixel 802 at (x, y) is minimized, and if all the orifices eject ink droplets, the density level is maximized. The intermediate density level between its minimum and maximum is expressed by a combination of selective ejections and non-ejections of ink droplets from orifices. In this prior art recording methods, what is explained is a recording method in which a pixel having 5 levels of the density level is formed and the number of ink ejections between 0 and 4 to each pixel is obtained by pseudo-halftoning processing such as an error diffusion method and a dither method and is stored in a memory, and in which data of the number in the memory is read out at every time of scannings, and thus, a pixel is formed by driving the recording head in responsive to this read-out data.

The ejection timing for forming the pixel 802 by each of orifices No. 100, No. 68, No. 36 and No. 4 in the scannings 801A, 801B, 801C and 801D of the recording head 801 is established by pulses from an encoder measuring the relative distance between the recording head 801 and the recording medium. After each of scannings 801A, 801B, 801C and 801D, the recording medium is transported with respect to the recording head in the direction vertical to the scanning direction by 32 times of the distance between adjacent orifices, that is, 32 pitches obtained by 128 divided by 4. By scanning four times the recording head, an image corresponding to 128 orifices can be recorded.

In the case of forming a single pixel with a single ink droplet, by selecting appropriate one of a plurality of orifices, the amount variation of ejected ink fluids from orifice to orifice can be reduced.

FIG. 2 is a schematic illustration showing an arbitrary part of an array of pixels arranged in the scanning direction of the recording head. Each pixel in the array is formed by ink droplets ejected from orifices No. 100, No. 68, No. 36 and No. 4 in the respective scanning 801A, 801B, 801C and 801D as shown in FIG. 1.

In FIG. 2, reference numerals 901 to 909 denote pixels, each number written in the pixels 901 to 909 represents the number of ejections to each pixel. The identification number of the orifice used for forming the pixel and the scanning number at which the orifice ejects an ink droplet are written below each of the corresponding pixels. For example, the number of ejections to the pixel 904 is one and the orifice No. 100 ejects an ink droplet in the scanning 801A for forming the pixel 904. And also, the number of ejections to the pixel 905 is two, and the orifices No. 100 and No. 68 eject ink droplets in the scannings 801A and 801B, respectively, for forming the pixel 905.

In FIG. 2, in the case that the number of ejections is one as to the pixels 901, 902 and 904, an ink droplet is always ejected from the orifice No. 100 in the scanning 801A. In the case that the number of ejections is two as to the pixels 905, 906 and 909, one ink droplet is always ejected from the orifice No. 100 in the scanning 801A and another ink droplet is always ejected from the orifice No. 68 in the scanning 801B. Similarly, in the case that the number of ejections is three as to the pixel 908, the orifice No. 100 is used in the scanning 801A, the orifice No. 68 is used in the scanning 801B and the orifice No. 36 is used in the scanning 801C, respectively. In the case that the number of ejections is four, all the orifices are always used in their corresponding scanning for forming a pixel.

However, in the case of forming a pixel in the above manner, if there occur, for example, in the orifice No. 100 always used, ejection failures such as disabled ejections, the less amount of ejected ink droplet, and further, ejection of ink droplet in unexpected directions, the recorded images may contain strip-noises or shadings. So far, even if a single pixel is formed by a plurality of ink droplets ejected from a plurality of orifices, there may be a case that high-quality recorded images cannot obtained and recording images is spent on too long time. In addition, a specific orifice, for example, the orifice No. 100, is used too often and other orifices are not used so frequently, and hence, there may be such problems that every orifice is not used uniformly and the lifetime of the recording head may be shorten.

This problem arises similarly in case of forming a single pixel with a single ink droplet.

SUMMARY OF THE INVENTION

An object of the present invention is to provide an ink jet recording apparatus and a recording method in which a plurality of good-conditioned orifices are uniformly used for recording images even in case that some of a plurality of orifices suffer from ejection failures and whereby the lifetime of the recording head can be enlarged.

Another object of the present invention is to provide an ink jet recording apparatus and a recording method in which the orifice used at first for each of pixels is different from one another with respect to pixels, and a plurality of orifices can be used uniformly in developing a plurality of pixels as the orifices are assigned to pixels in a designated order.

In the first aspect of the present invention, there is provided an ink jet recording apparatus for recording an image with a set of pixels formed by ejecting an ink droplet onto a recording medium, comprising:

a recording head having a plurality of discharging portions from each of which the ink droplet is ejected;

a driving means for making the recording head eject the ink droplet according to driving data; and a data setting means for assigning the driving data to a plurality of individually different discharging portions so as to form each one of the pixels by means of a plurality of ink droplet ejected from a plurality of individually different discharging portions, which are different from one of the pixels to another of the pixels.

Here, the ink jet recording apparatus may further comprise a scanning means for performing a scanning operation of the recording head for recording, and each of a plurality of individually different discharging portions is used to eject an ink droplet in respective different scanning of the recording head.

The recording head may generate a bubble in an ink fluid by thermal energy and eject the ink droplet in responsive to generation of the bubble.

The data setting means may assign a plurality of driving data to a plurality of individually different discharging portions in a predetermined order, and the discharging portion assigned at first to each of the pixels is different from one of the pixels to another of the pixels.

The discharging portion assigned at first may be one next to the discharging portion assigned in the previous data setting of the pixel in the predetermined order.

The predetermined order may be an sequential order of a plurality of individually different discharging portions.

The predetermined order may be a sequential order of a plurality of individually different discharging portions, and the discharging portion assigned at first is determined in accordance with a position of a corresponding pixel in a set of pixels.

The predetermined order may be a sequential order of a plurality of individually different discharging portions, and the discharging portion assigned at first may be determined randomly.

In the second aspect of the present invention, there is provided an ink jet recording apparatus for recording an image with a set of pixels formed by ejecting an ink droplet onto a recording medium, comprising:

a plurality of recording heads each of which has a plurality of discharging portions, each of a plurality of recording heads ejecting individually different kinds of ink droplets from each of a plurality of discharging portions, respectively;

a driving means for making a plurality of recording heads eject respective ink droplets in responsive to driving data; and a driving data setting means for assigning the driving data to a plurality of individually different discharging portions of a plurality of recording heads so as to form each one of the pixels by means of a plurality of ink droplets ejected from a plurality of individually different discharging portions of a plurality of recording heads, identical kinds of ink droplets of a plurality of ink droplets being ejected on different positions from one another in each one of the pixels, and the discharging portions to which the driving data are assigned at first in a plurality of recording heads ejecting ink droplets on identical positions with one another.

Here, an ink jet recording apparatus may further comprise a scanning means for performing a scanning operation of a plurality of recording heads for recording, and each of a plurality of discharging portions in each of a plurality of recording heads ejects a respective kind of ink droplet in respective different scanning of the recording head.

Each of a plurality of recording heads generates a bubble in an ink fluid by thermal energy and ejects the ink droplet in responsive to generation of the bubble.

In the third aspect of the present invention, there is provided an ink jet recording apparatus for recording an image with a set of pixels formed by ejecting an ink droplet onto a recording medium, comprising:

a recording head having a plurality of discharging portions from each of which the ink droplet is ejected;

a driving means for making the recording head eject the ink droplet according to driving data; and a data setting means for assigning the driving data to one of a plurality of discharging portions so as to form each of the pixels, one of a plurality of discharging portions being different from one of the pixels to another of the pixels.

Here, the ink jet recording apparatus may further comprise a scanning means for performing a scanning operation of the recording head, and one of a plurality of discharging portions ejects the ink droplet in respective different scanning of the recording head.

The recording head may generate a bubble in an ink fluid by thermal energy and eject the ink droplet in responsive to generation of the bubble.

One of a plurality of discharging portions may be different from one of the pixels to another of the pixels in the direction of the scanning of the recording head.

One of a plurality of discharging portions may be different from one of the pixels to another of the pixels in the direction of array of a plurality of discharging portions.

The driving data may be a gray scale level data, and each of the pixels may be formed by means of one or more ink droplets ejected from a plurality of discharging portions.

In the fourth aspect of the present invention, there is provided an ink jet recording method for recording an image with a set of pixels formed by ejecting an ink droplet onto a recording medium, comprising the steps of:

provviding for a recording head having a plurality of discharging portions from each of which the ink droplet is ejected;

assigning driving data to a plurality of individually different discharging portions so as to form each one of the pixels by means of a plurality of ink droplets ejected from a plurality of individually different discharging portions, which are different from one of the pixels to another of the pixels; and making the recording head eject the ink droplet according to the driving data assigned.

Here, the ink jet recording method may further comprise a step for performing a scanning operation of the recording head for recording, and each of a plurality of individually different discharging portions is used to eject an ink droplet in respective different scanning of the recording head.

The recording head may generate a bubble in an ink fluid by thermal energy and eject the ink droplet in responsive to generation of the bubble.

The assigning step may assign the driving data to a plurality of individually different discharging portions in a predetermined order, and the discharging portion assigned at first to each of the pixels is different from one of the pixels to another of the pixels.

The discharging portion assigned at first may be one next to the discharging portion assigned in the previous data setting of the pixel in the predetermined order.

The predetermined order may be a sequential order of a plurality of individually different discharging portions.

The predetermined order may be a sequential order of a plurality of individually different discharging portions, and the discharging portion assigned at first may be determined in accordance with a position of a corresponding pixel in a set of pixels.

The predetermined order may be a sequential order of a plurality of individually different discharging portions, and the discharging portion assigned at first may be determined randomly.

In the fifth aspect of the present invention, there is provided an ink jet recording method for recording an image with a set of pixels formed by ejecting an ink droplet onto a recording medium, comprising the steps of:

providing for a plurality of recording heads each of which has a plurality of discharging portions, each of a plurality of recording heads ejecting individually different kinds of ink droplets from each of a plurality of discharging portions, respectively;

assigning driving data to a plurality of individually different discharging portions of a plurality of recording heads, so as to form each one of said pixels by means of a plurality of ink droplets ejected from a plurality of individually different discharging portions of a plurality of recording heads, identical kinds of ink droplets of a plurality of ink droplets being ejected on different positions from one another in each one of the pixels, and the discharging portions to which the driving data are assigned at first in a plurality of recording heads ejecting ink droplets on identical positions with one another; and making a plurality of recording heads eject respective ink droplets in responsive to the driving data assigned.

The method may further comprise a step for performing scanning operations of a plurality of recording head for recording, and each of a plurality of discharging portions in each of a plurality of recording head ejects a respective kind of ink droplet in respective different scanning of the recording head.

Each of a plurality of recording heads may generate a bubble in an ink fluid by thermal energy and eject the ink droplet in responsive to generation of the bubble.

In the sixth aspect of the present invention, there is provided recording method for forming a pixel on a designated line on a recording medium by scanning a recording head ejecting an ink fluid from a plurality of discharging portions, comprising the steps of:

selecting a plurality of discharging portions which can be used for forming said pixel on the designated line;

determining the discharging portion used for forming the first pixel on the designated line in accordance with ejection data corresponding to an ejection from a plurality of selected discharging portions onto the first pixel; and determining the discharging portion used for forming the second pixel on the designated line among a plurality of selected discharging portions in accordance with data corresponding to an ejection from the discharging portion determined to be used before a plurality of selected discharging portions to the second pixel.

The ejection data may be defined as gray scale level data, and the pixel on the designated line may be formed by a single ink droplet or a plurality of ink droplets ejected from a plurality of discharging portions.

The discharging portion used for forming the second pixel may be determined in a predetermined order among a plurality of selected discharging portions.

The recording head may generate a bubble in an ink fluid by thermal energy and ejects the ink droplet in responsive to generation of the bubble.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a schematic illustration illustrating the correspondency between an individual pixel and an individual orifice used for forming the pixel by one example of the recording method using the method shown in FIG. 1;

FIG. 12 is a schematic illustration showing an example of results by setting driving data for an individual pixel in the procedures shown in FIG. 11;

FIG. 16 is a schematic illustration showing an example of results by setting driving data for an individual pixel in the procedures shown in FIG. 15;

DETAILED DESCRIPTION OF PREFERRED EMBODIMENTS

As will be described, these and other features of the present invention and one embodiment of it are more fully described below in the detailed description and with the accompanying drawings.

Figure 3:
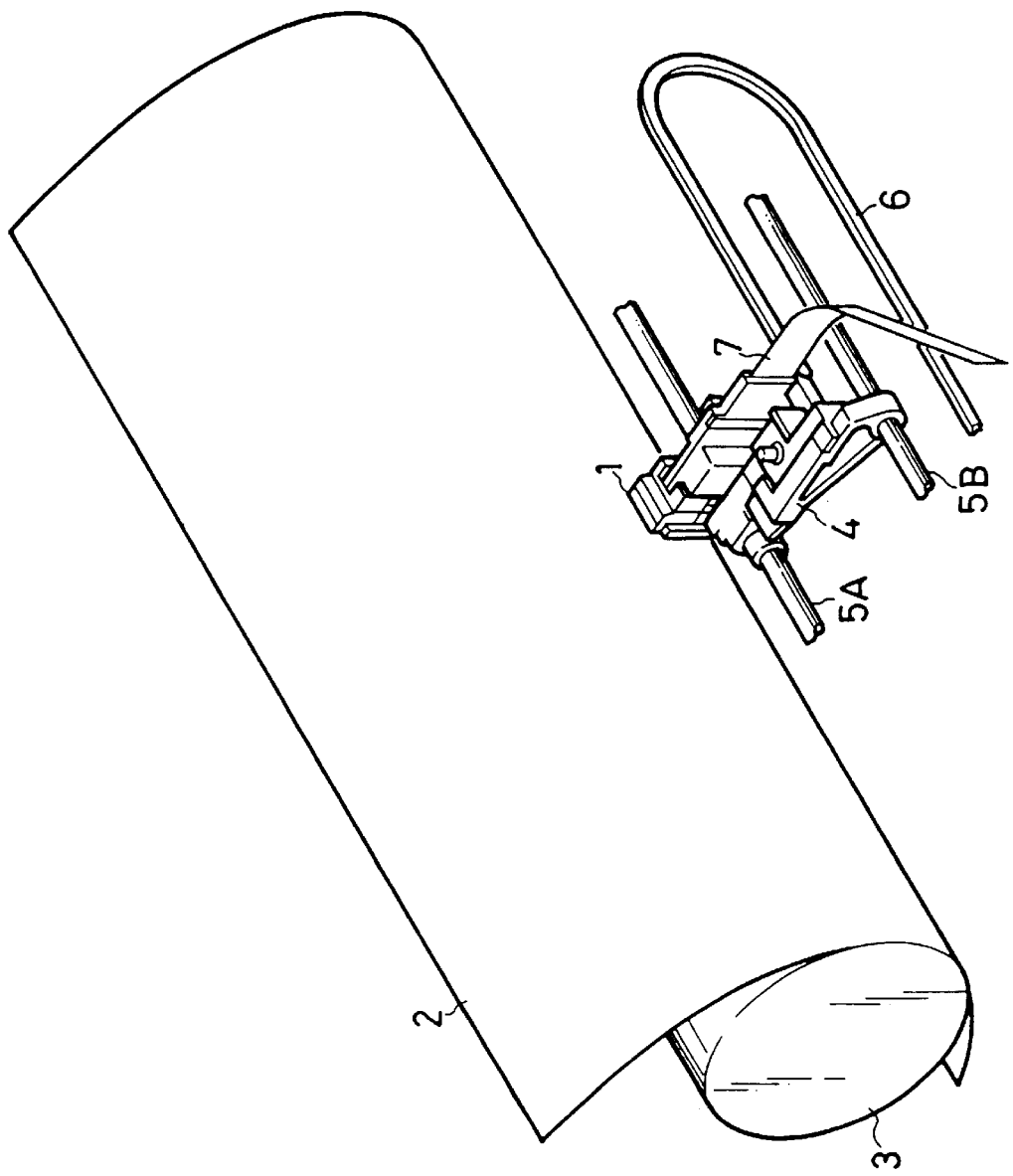
FIG. 3 is a perspective view showing a major part of an ink jet recording apparatus applicable to embodiments of the present invention.

FIG. 3 is a perspective view showing major parts of an ink jet recording apparatus of one embodiment of the present invention. In FIG. 3, in the recording head 1, for example, 32 orifices with their mutual interval being 63.5 $\mu$m (400 dots per inch) are placed in an array extended in the direction in which the recording paper 2 is fed, this direction designated sub-scanning direction, and in each ink path connecting to each corresponding orifice, installed is a heater for generating thermal energy used for ejecting ink droplets. The heater generates thermal energy in responsive to electric pulses correlated with driving signal data, and film boiling occurs in the ink fluids which leads to generating a bubble and finally to ejection of an ink droplets from the orifice. In this embodiment, the frequency of heater driving signals, that is, the ejection frequency, is 2 kHz. Incidentally, in embodiment described here and hereinafter of the present invention, term "discharging portion", "outlet" or "nozzle" may be used instead of term "orifice".

A carriage 4 on which a recording head 1 is mounted is supported by a couple of guide shafts 5A and 5B so as to move freely along the guide shafts 5A and 5B. In the following description, this movement of the recording head 1 is called main-scanning and its scanning direction is called main-scanning direction. The carriage 4 is fixed on a part of a belt expanded by pulleys and the carriage 4 is moved by rotational movements of pulleys driven by the motor linked with the pulleys. In FIG. 3, these pulleys and the motor are not shown. An ink tube 6 is connected to the recording head 1, through which the ink fluids can be supplied from an ink tank not shown to the recording head 1. A flexible cable 7 is connected to the recording head 1 which can transmit driving signals corresponding to recording data and control signals from a host apparatus or a control part of the ink jet recording apparatus to a head driving circuit (a head driven). The ink supply tube 6 and the flexible cable 7 are composed of flexible materials so as to follow the movement of the carriage 4.

The longer side of the platen roller 3 is extended in parallel to the guide shafts 5A and 5B and the platen roller 3 is driven by a paper feed motor not shown and used for feeding a recording sheet 2 as recording media and for defining a recording face of the recording sheet 2. In the above described structure, the recording head 1 ejects the ink fluids on the recording face of the recording sheet 2 in front of the orifices of the recording head 1.

Figure 4:
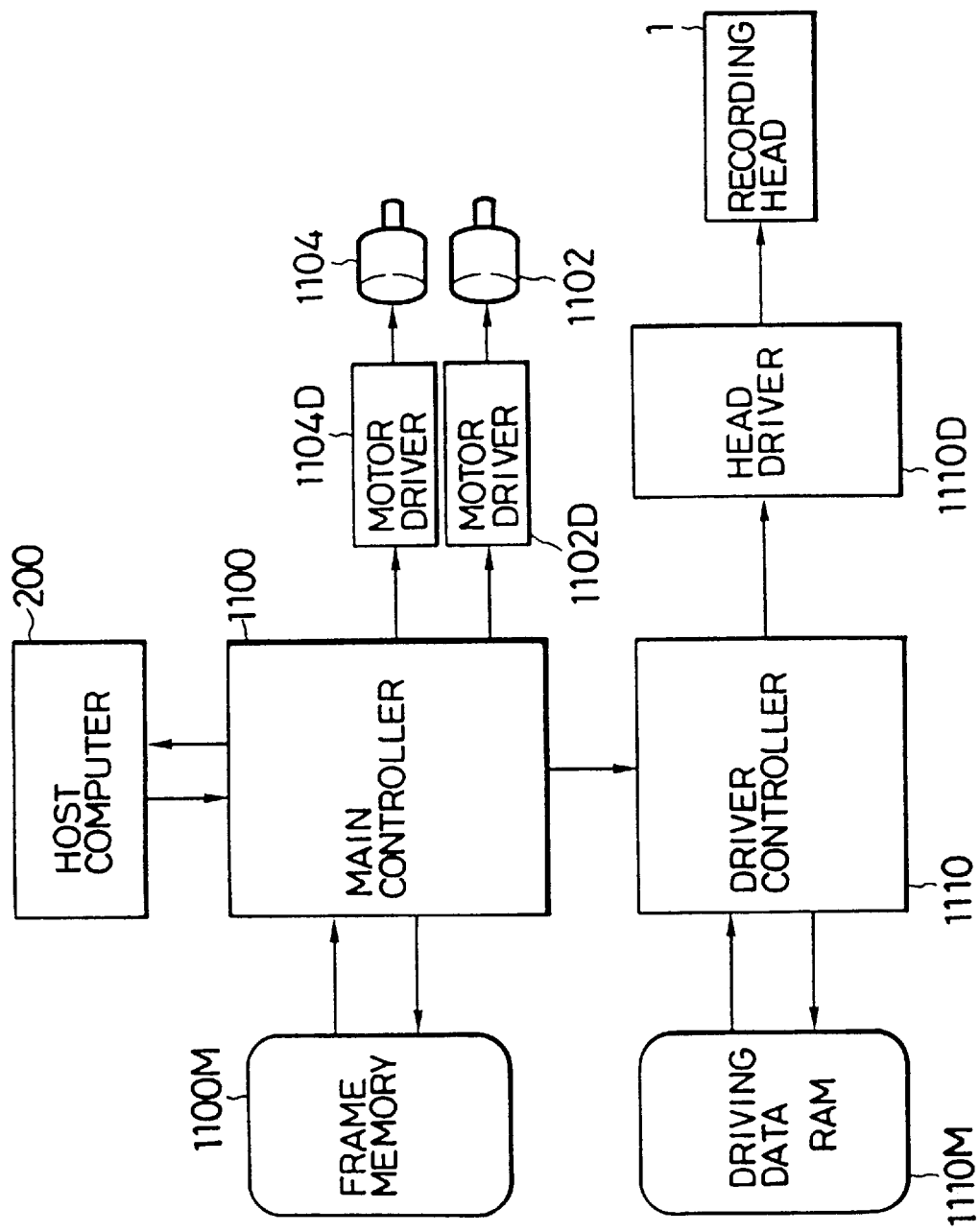
FIG. 4 is a block diagram showing a control structure of the apparatus shown in FIG. 3.

FIG. 4 is a block diagram showing a control structure of the ink jet recording apparatus as shown in FIG. 3.

A main controller 1100 is composed of CPU and so on, and transfers image data supplied from a host computer 200 into density level data of each pixel and store the density level data into the frame memory 1100M. The main controller 1100 supplies the density level data of each pixel stored in the frame memory 1100M to the driver controller 1110 in predetermined timing. As described later with FIG. 15 and so on, the driver controller 1110 converts the density level data supplied from the frame memory 1100M into drive data which describes turn-on or turn-off signals to each heater of the recording head 1 and each of which corresponds to a respective orifice index number and respective scan number. The orifice index number is the order of the orifice array in the recording head and the scan number is the sequential number of main-scanning operations. The drive data converted by the driver controller 1110 are stored in the drive data RAM 1110M. The driver controller 1110 read out the drive data stored in the drive data RAM 1110M by referring their orifice index number and scan number in responsive to control signals from the main controller 1100, and supplies the read-out drive data into the head driver 1110D and controls its driving timing.

In the above described structure, the main controller 1100 controls the ink ejection by the recording head 1 and the rotational movements of the carriage drive motor 1104 and the paper feed motor 1102 through the driver controller 1110, the motor driver 1104D and the motor driver 1102D. So far, characters and graphic images corresponding to input image data are recorded on the recording sheet 2.

In the above described structure, though the driver controller 1110 converts the density level data into the drive data, this conversion may be performed by the main controller 1100. In this case, the drive data can be stored in the frame memory 1100M and hence, the RAM 1110M can be removed.

Figure 5:
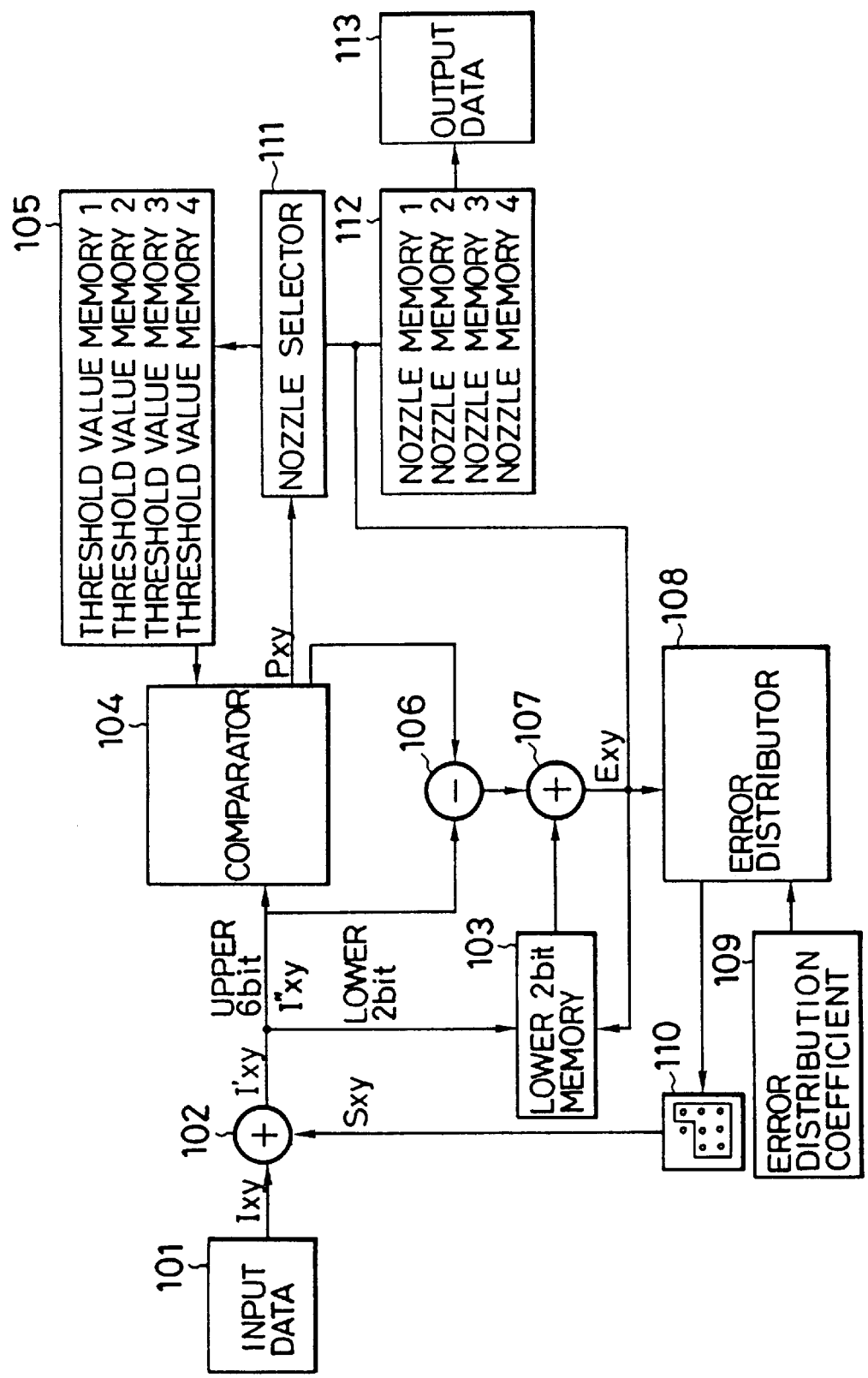
FIG. 5 is a block diagram showing a structure for image signal processing and assignment of driving data in one embodiment of the present invention.
Figure 6:
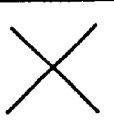
FIG. 6 is a schematic illustration of a diffusion matrix used in an error diffusion processing in the above embodiment.

FIG. 5 is a block diagram showing a structure of image signal processing composed in the control structure shown in FIG. 4. In the figure, for the clarity of explanation, a simplified signal processor is shown, in which the density level with five levels of one pixel is expressed by ink droplets ejected from four different orifices (also called nozzles hereinafter).

In FIG. 5, input data 101 are 8-bit data representing gray levels between 0 and 255 and are assigned in correspondence with each of pixels. The input data of a specified pixel (x,y) are inputted as input data Ixy, to which an error data Sxy are added by an adder 102 in order to obtain data I'xy. The lower 2 bits of data I'xy are stored in a lower 2-bit memory, and the upper 6 bits thereof, as data I"xy, are transmitted to a comparator 104. That is, a density level value of the data I"xy is one-fourth of the density level value of the data I'xy to which the error data Sxy are added. A comparator 104 compares in magnitude the data I"xy with one of threshold data in a threshold memory unit 105. If the data I"xy is equal to or larger than the threshold data in the threshold memory unit, "1" is, as data Pxy output and if not, "0" is outputted. In addition, the threshold data are transferred to a subtractor 106 to obtain the difference between the threshold value and the data I"xy. An adder 107 adds the data from this subtractor 106 to the lower 2-bit data of the data I'xy to which the error has already been added. The sum is, as output from the adder 107, transferred to an error distributor 108 to distribute around a noted pixel according to an error diffusion matrix determined by an error distribution coefficient 109. In other words, the output Exy is stored according to the error diffusion matrix, in a memory for accumulating the errors distributed around the specified pixel. The output Sxy of a distributed error accumulating memory 110 is added to the data Ixy of the noted pixel to be processed, by the adder 102. A nozzle memory unit 112 has a line memory of 1 bit, and stores the driving data of each orifice, namely "0" or "1". A numeral 113 denotes an output data including the driving data of a line which is now recording.

In the structure described above, the data (values) of each threshold memory in the threshold memory unit 105 is presets as follows.

Threshold memory 1 . . . threshold value 8
Threshold memory 2 . . . threshold value 24
Threshold memory 3 . . . threshold value 40
Threshold memory 4 . . . threshold value 56

Figure 7:
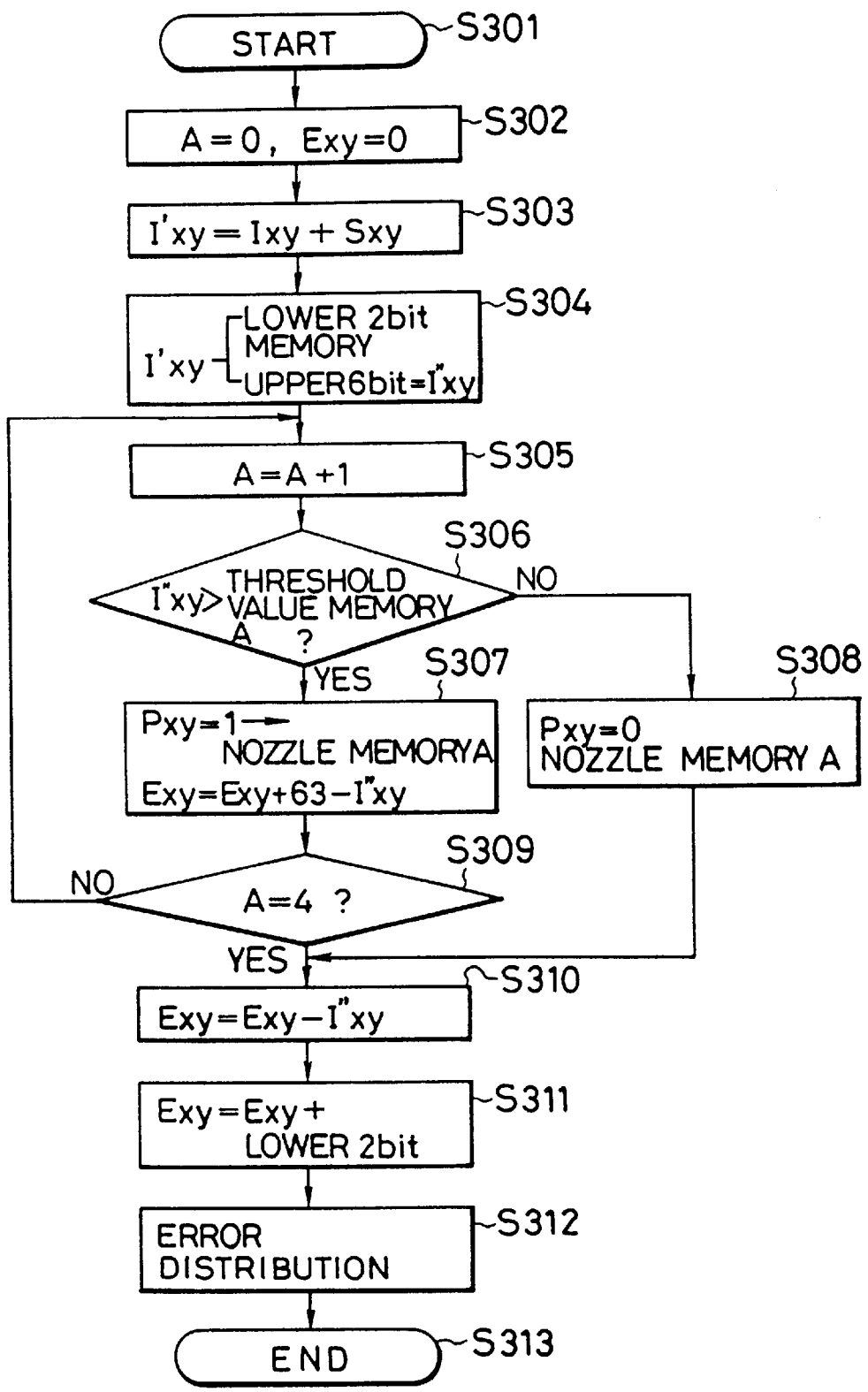
FIG. 7 is a flow chart showing procedures in the above embodiment.

The distribution ratio of the error diffusion coefficient 109 is as that of FIG. 7. The nozzle memory unit 112 is set to zero every one scanning. The above structure is that of the error diffusion of a multi-fixed threshold values. The structure will be described in details hereinafter.

In order to obtain the data I'xy, added to the data Ixy of the specified pixel is the error Sxy which has already distributed by the multi-level (in this case, five-level) half-toning processing of other pixel which has processed before the specified pixel is to be processed. The data I'xy divided into the upper 6 bits and the lower 2 bits stored in the lower 2-bit memory. That is, it means that the data I'xy are reduced to one-fourth level, and the remainder is stored in the memory 103. The multi-level halftoning processing of the image signal is essentially performed to the data I"xy of the upper 6 bits.

The data I"xy are compared with the value of the threshold memory 1, namely the threshold value 8, in the comparator 104. At this time, selected is a threshold memory with the same number as that of the nozzle memory selected by the nozzle selector. Next, as a result of comparison, if the data I"xy is equal to or larger than the threshold value of the threshold memory 1, then "1" is outputted to the nozzle selector 111 as the output Pxy, if it is smaller than that, than "0" is outputted. The nozzle selector 111 allows the output Pxy to store in the nozzle memory 1. At the same time, the comparator 104 send the threshold value at the time to the subtractor 106, in which difference between the threshold value and data I"xy is calculated. The output (difference value) of the subtractor 106 is transferred to the adder 107. Next, the nozzle selector 111 selects the nozzle memory 2 and the threshold memory 2. The comparator 104 compares in a manner similar to that described above, and sends the threshold value to the subtractor 106, in which the processing similar to that described above is performed. The output of the subtractor 106 is added to the last output of the subtractor 106. Similarly, the nozzle selector 111 selects in order the nozzle memory 3, 4 and the threshold memory 3, 4 and performs the procedure similar to that described above. However, when the value of the output Pxy turns to "0", selecting operation of the nozzle selector 111 would be stopped.

In other words, either when the nozzle selector 111 is counted up to 4, or when the output Pxy turns to "0", the data accumulated in the subtractor 106 and the data of lower 2 bit of the input data I'xy stored in lower 2 bit memory 103, are finally added in the adder 107. The sum is transferred as error data Exy to the error distributor 108.

FIG. 7 is a flow chart illustrating in details the procedure of the error diffusion processing and the driving data formation, which are described above, and FIG. 8 is a graph showing the relationship at this time between the input data I'xy, and the number of ejected liquid droplets and the corresponding orifice number. It is assumed that the specified pixel is formed by the orifices of #4, #36, #68 and #100 shown in FIG. 1. Further assumed that the density level of the input data of the specified pixel (x,y) is Ixy=195, and the errors which has already diffused around this pixel is Sxy=2, that various processing such as the input γ-correction, the color-correction, the black production, the output γ-correction, etc. in the image recording apparatus have already completed, and that the nozzle memories 1 to 4 corresponding to the specified pixel (x,y) each is set to zero.

In FIG. 7, before starting the processing of the specified pixel, a counter A for counting up the nozzle selector 111 is set to zero, and the accumulated error Exy is also set to zero at step S302. At step S303, the error data Sxy are added to the specified pixel data Ixy by the adder 102 to yield the dat I'xy. At next step S304, the lower 2 bits of the data I'xy are stored in the lower 2 bit memory 103, and the upper 6 bits thereof are set as the data I"xy. At step S305, the value 1 is added to the counter A. At step S306, the value of I"xy is compared with the threshold value stored in the threshold memory 1, the numeral of which corresponds to the value of the counter A, i.e. the value 1, by means of the comparator 104. If the value of data I"xy is equal to or larger than that of the threshold memory 1, then it goes to step S307, and if the value of data I"xy is smaller than that of the threshold memory 1, then it goes to step S308. When the value of the data I"xy is equal to or larger than that of the threshold memory 1, at step S307, "1" is outputted as the output Pxy to the nozzle selector 111, which causes the output value to store in the nozzle memory 1. At the same time, the calculation of Exy=Exy+63-I"xy is carried out, using the subtractor 106 and the adder 107. Next, at step S309, whether or not the value of A equals to 4 is checked. When its value is 4, it goes to step S310. In this event, since A=1, it returns to the step S305, and the processing following the step S305 are repeated. On the other hand, when the value of data I"xy is smaller than the threshold value of the threshold memory designated by the counter A, at the step S308, "0" is outputted as the output Pxy to the nozzle selector 111, which stores in the nozzle memory designated by the counter A, and then it goes to the step S310.

In summary, the value of the data I"xy is compared in order with each of four threshold values three times, or these steps, that is, binarizations are repeated until the value of the data I"xy becomes smaller than the threshold value. Either ejection or non-ejection from the orifices, that is, formation of the driving data of each orifice is determined each time, and the errors are accumulated.

Next, at the step S310, data I"xy are subtracted from the errors accumulated so far by means of the subtractor, and the result is set as new accumulated errors Exy. At next step S311, the lower 2 bits of the data I'xy are added to the accumulated errors Exy by means of the adder 107. At step S312, the result is distributed to other pixels as process errors in the specified pixel (x,y).

The above processing is represented by the following equations concretely.

$Ixy=195$, $Sxy=2$, thus $I'xy=195+2=197$ (see step S303)

$I'xy=11000101$ (binary)

Upper six bits=110001=49, lower two bits=01=1.

A=1:

$I"xy=49>$threshold value 8 (see step S306), then $Pxy=$"1", and nozzle memory 1 (orifice #100)→"1"

$Exy=63-49=14$ (see step S307)

A=2:

$I"xy=49>$threshold value 24, then $Pxy=$"1", and nozzle memory 2 (orifice #68)→"1"

$Exy=14+63-49=28$

A=3:

$I"xy=49>$threshold value 40, then $Pxy=$"1", and nozzle memory 3 (orifice #36)→"1"

$Exy=28+63-49=42$

A=4:

$I"xy=49<$threshold value 56, then $Pxy=$"0", and nozzle memory 4 (orifice #4)→"0"

$Exy=42-49=-7$ (see step S310)

$Exy=-7+1=-6$ (see step S311)

As described above, the halftoning of the specified pixel (x,y) is represented by each liquid droplet ejected ("1") from three orifices #100, #68 and #36. The error Exy to be distributed when the five-level halftoning processing in the specified pixel is performed, is -6.

Figure 8:
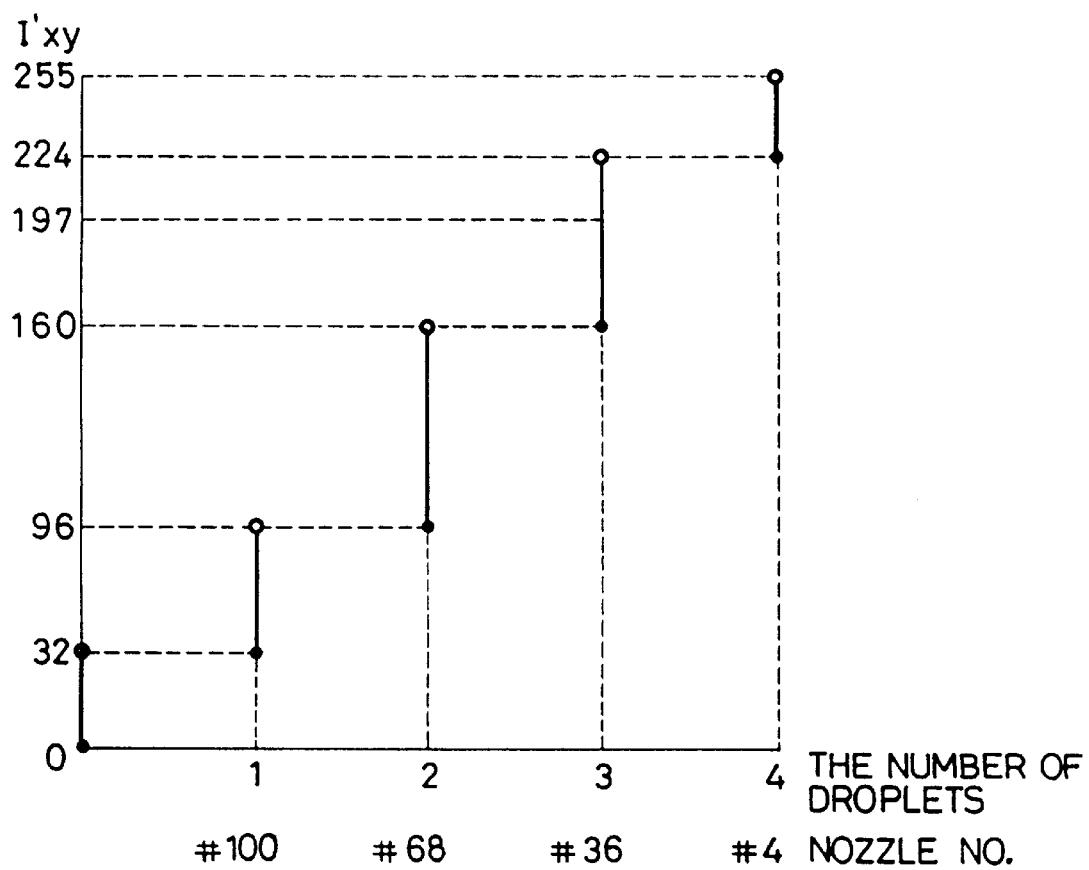
FIG. 8 is a graph illustrating the relationship between input density level data and the number of ink droplets in the above embodiment.

The above result will be checked in light of FIG. 8. The input data Ixy is 195 and the error is +2, hence I'xy is 197. The pixel must be, therefore, formed by three liquid droplets. According, it can be seen that the above result accords with the relationship illustrating in FIG. 8.

It should be appreciated that the above method is not limited within the range of the present embodiment such that a single pixel may be formed by four orifices (recording elements), that is, the number of orifices is not limited to four, and that the above method is effective for such an approach that a single pixel may be formed by lots of orifices. In the above embodiment, the medium value of the density level corresponding to the number of the ejected liquid droplets was used as a threshold value (the actual threshold value is one-fourth of the density level data). It should be also appreciated that, in the case that the density level does not directly correspond to the number of ejected droplets, the threshold value may be set to adapt to the characteristic of the density level. What is, in embodiments of the present invention, described below is recording methods in which driving data obtained by the image processing described above are used.

Embodiment 1

Figure 9:
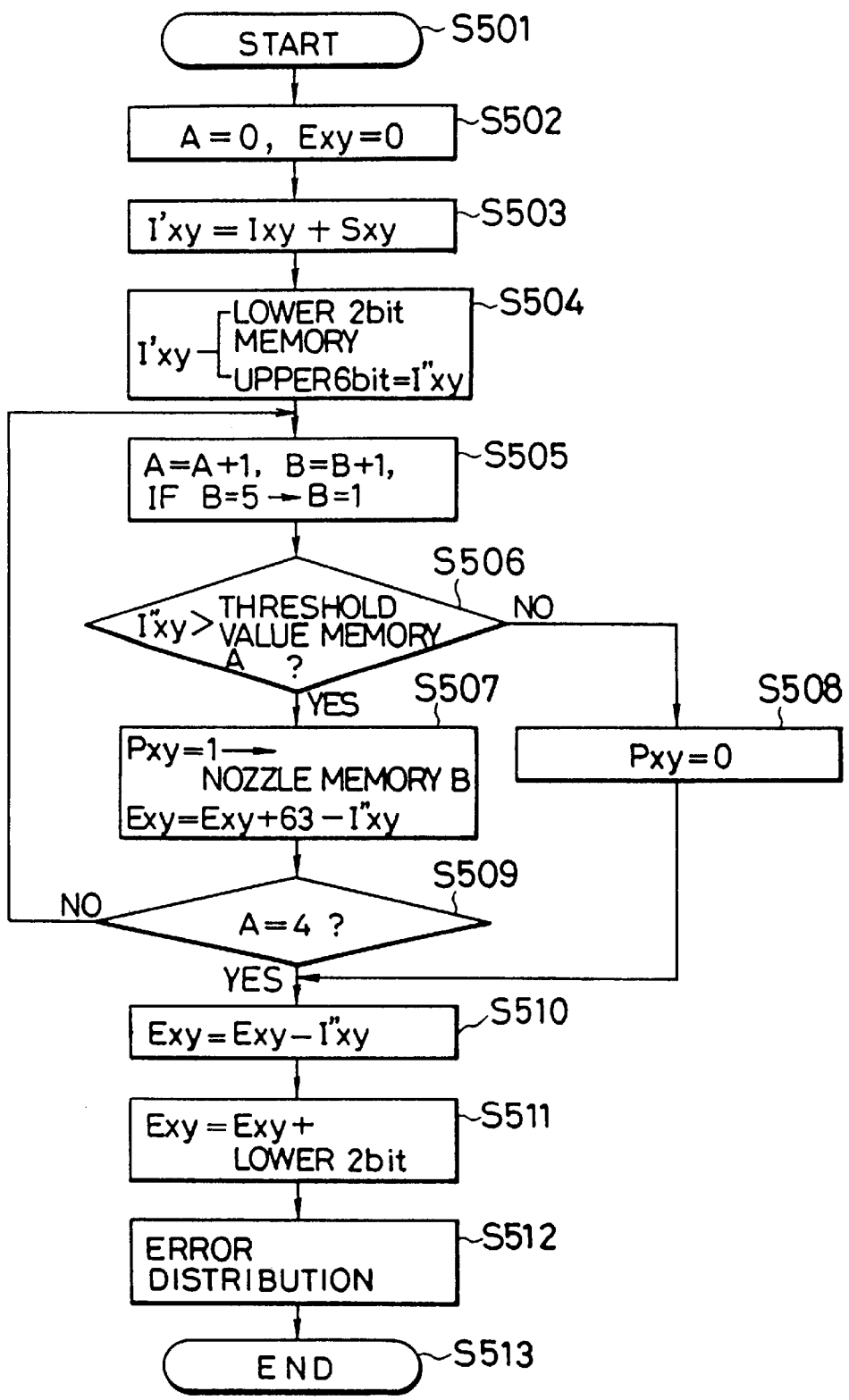
FIG. 9 is a flow chart illustrating the procedure in Embodiment 1 of the present invention.

FIG. 9 is a flow chart illustrating the procedure of Embodiment 1A of the present invention. The circuit structure of hardware is similar to that of Embodiment 1 shown in FIG. 5.

Referring to FIG. 9, there is shown the difference between the flow chart of FIG. 9 and that of Embodiment 1 shown in FIG. 7. In Embodiment 1A, there is provided with another counter B besides the counter A. The nozzle memory is selected in accordance with the value of the counter B. The operation of Embodiment 1 is the same as that of Embodiment 1 expect this point. As shown at step S505, the counter B always has one of the count numbers 1 to 4 in succession. That is, the counter is not reset even when the specified pixel is changed, and continues to count. Thus the count number changed from 4 to 1.

By such structure, the assignment of the driving data of each of pixels to the nozzle memory does not always start from the same nozzle memory 1, that is, it starts from the nozzle memory next to one which the driving data "1" was assigned in one before pixel (see step S507). In other words, even if the input data have the density level, the orifices to be selected change sequentially every specified pixel. Accordingly, it can be prevented that the same orifice is always used. For example, in the case that the density level of data is 127, it can be prevented that only the combination of the orifices #100 and #68 is used, accordingly, density speckles arising due to variance of an ejection characteristics among orifices.

Embodiment 1A

Figure 10:
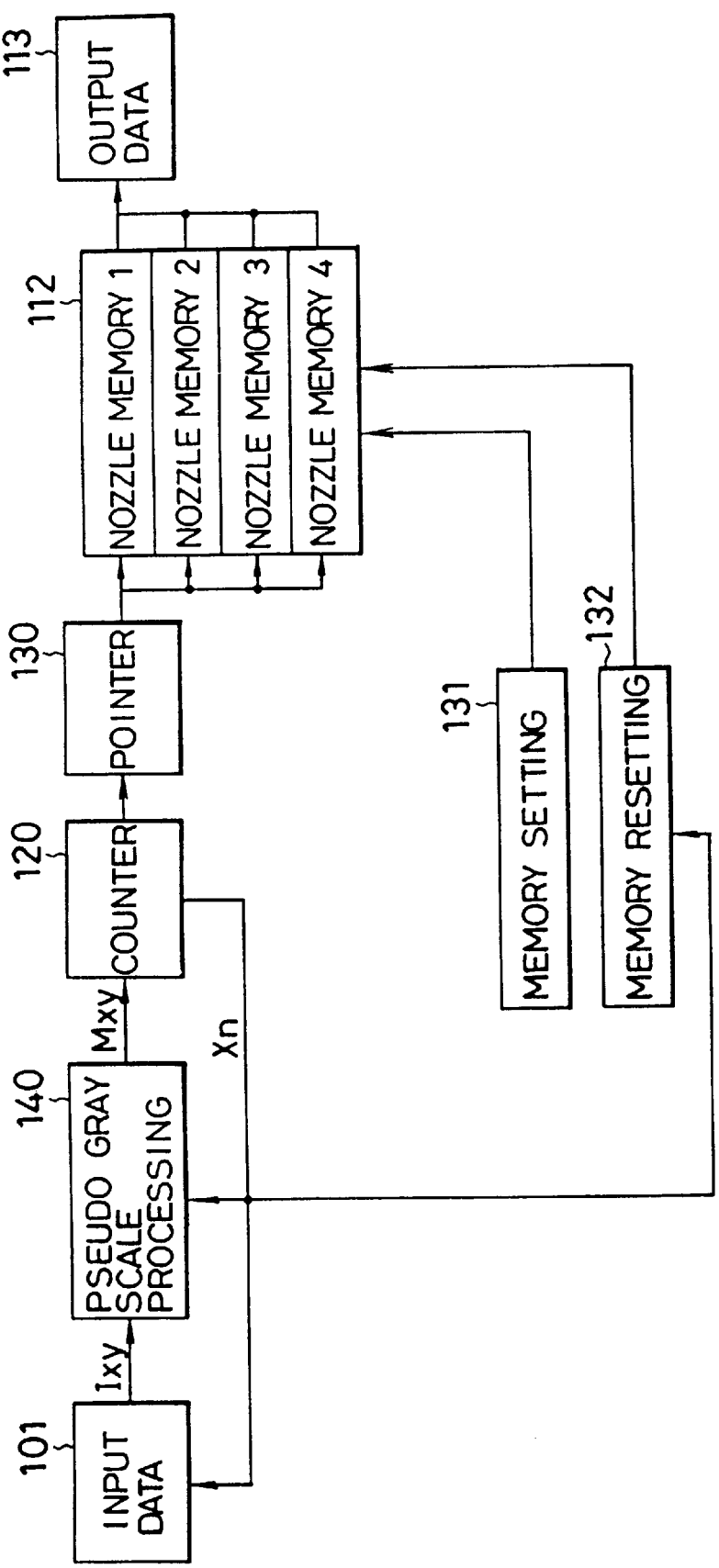
FIG. 10 is a block diagram showing a structure for an image signal processing in Embodiment 1 of the present invention.

FIG. 10 is a block diagram showing a circuit structure for image signal processing of Embodiment 1A of the present invention.

In FIG. 10, reference numeral 101 denotes input data, and signals Ixy extracted from the input data 101 is an 8-bit data representing density level between 0 and 255 of a pixel at (x, y), where x is an address in the direction of scanning of the recording head, and y is an address in the direction along which orifices of the recording head are arranged in an array. The signal Ixy is obtained as a result of a designated image processing such as γ-correction and, in case of color images, color correction. The 8-bit data of the signal Ixy is transformed into 5-level data Mxy in the pseudo-halftoning processing part 140 by error diffusion method and so on, in the similar manner to that explained above. A 3-bit counter 120 accepts the signal Mxy from the pseudo-halftoning processing part 140 and counts down from a value defined by the signal Mxy. A pointer 130 points one of nozzle memories 1 to 4 in the memory unit 112 in responsive to the output data from the counter 120. Each of nozzle memories 1 to 4 is a 1-bit line memory storing data defining "on" or "off" of each of orifices used for forming pixels recorded on an array on the recording sheet during a scanning of the recording head. As for orifices No. 100, No. 68, No. 36 and No. 4 for forming the pixel 802 shown in FIG. 1, the nozzle memory 1 stores a signal determining whether the orifice No. 100 ejects an ink droplet or not, the nozzle memory 2 stores a signal determining whether the orifice No. 68 memory ejects an ink droplet or not, the nozzle memory 3 stores a signal determining whether the orifice No. 36 memory ejects an ink droplet or not, and the nozzle memory 4 stores a signal determining whether the orifice No. 4 memory ejects an ink droplet or not. A memory setting 131 sets "1" in any one of the nozzle memories 1 to 4 designated by the pointer 130. A memory resetting 132 sets "0" in all of the nozzle memories 1 to 4. Reference numeral 113 denotes output data composed of signals output from the nozzle memories 1 to 4. Data representing whether each orifice ejects an ink droplet or not in the scanning of the recording head is output from the output data 113. A signal Xn is used for reporting that the pixel to be processed is altered in the scanning direction of the recording head to some parts of this circuit shown in FIG. 10.

The above described circuit is provided for each of 128 orifices of the recording head, and the function of the circuit is to assign data processed with pseudo-halftoning processing to each of the nozzle memories 1 to 4 corresponding to each of orifices. In the following, a detail function of this circuit is explained.

Input Ixy of specified pixel from input data 101 is 8-bit data representing density level between 0 and 255. In the pseudo-halftoning processing part 140, error data induced from data of pixels around the specified pixel are added to the input data having 256 levels of the specified pixel, and then the data having 256 gray levels is converted into data having 5 gray levels by using a designated threshold value and errors produced by this connection are distributed to pixels around the specified pixel. That is, the output data Mxy from the pseudo-halftoning processing part 140 is a 3-bit data having a level between 0 and 4. The 5-level output data Mxy is loaded on the 3-bit counter 120, and the 3-bit counter 120 checks its level in such a manner that if the level is 0, the 3-bit counter 120 outputs a signal Xn to the input data part 101 for requesting the input data part 101 to send the next data corresponding to the pixel at (x+1, y), and if the level is not 0, the 3-bit counter 120 sends a signal reporting the existence of data to the pointer 130 and counts down by 1. The memory setting 131, in responsive to the input signal reporting the existence of data from the counter 120, sets "1" in the nozzle memory to which the pointer 130 directs so as to allow its corresponding orifice to eject ink. At the same time, the pointer 130 increments its pointer directing to the nozzle memories.

The pointer 130 directs sequentially the nozzle memories 1 to 4, and its pointing nozzle memory number is incremented only when "1" is set in the nozzle memory currently pointed by the pointer 130 as described above. In the case that the pointer 130 directs to the nozzle memory 4 and "1" is set to the nozzle memory 4 at the same time, the pointer 130 comes to direct to the nozzle memory 1. So far, as far as any of the nozzle memory 1 to 4 is not set with "1", the nozzle memory directed by the pointer 130 is maintained to be identical even if the address x of the pixel in the scanning direction of the recording head changes. Every time the nozzle memory accepts the value "1", the nozzle memories to be directed are altered sequentially. The above mentioned incremental processes continue until the value of the counter 120 reaches "0" reaches "0", and when it reaches "0", the counter requests the input data part 101 to send the next data corresponding to the pixel at (x+y, y).

So far, data for ejecting an ink droplet to a pixel, "1", or non-ejection of an ink droplet to a pixel, "0", are stored for forming a line of pixels in the nozzle memories 1 to 4, and these data are supplied to the recording head from the output data part 113 in responsive to the scanning timing of the recording head. In addition, the memory resetting 132 previously sets "0" in specific nozzle memories corresponding to pixels to which data are to be assigned, every time when a specified pixel is shifted by a single pixel in the scanning direction.

It is allowed that all the data may be reset to be "0" at the beginning of assignment processing in the designated line of pixels to which data are to be assigned, rather than resetting each memory to be "0" every data setting of one pixel by the memory resetting 132.

Figure 11:
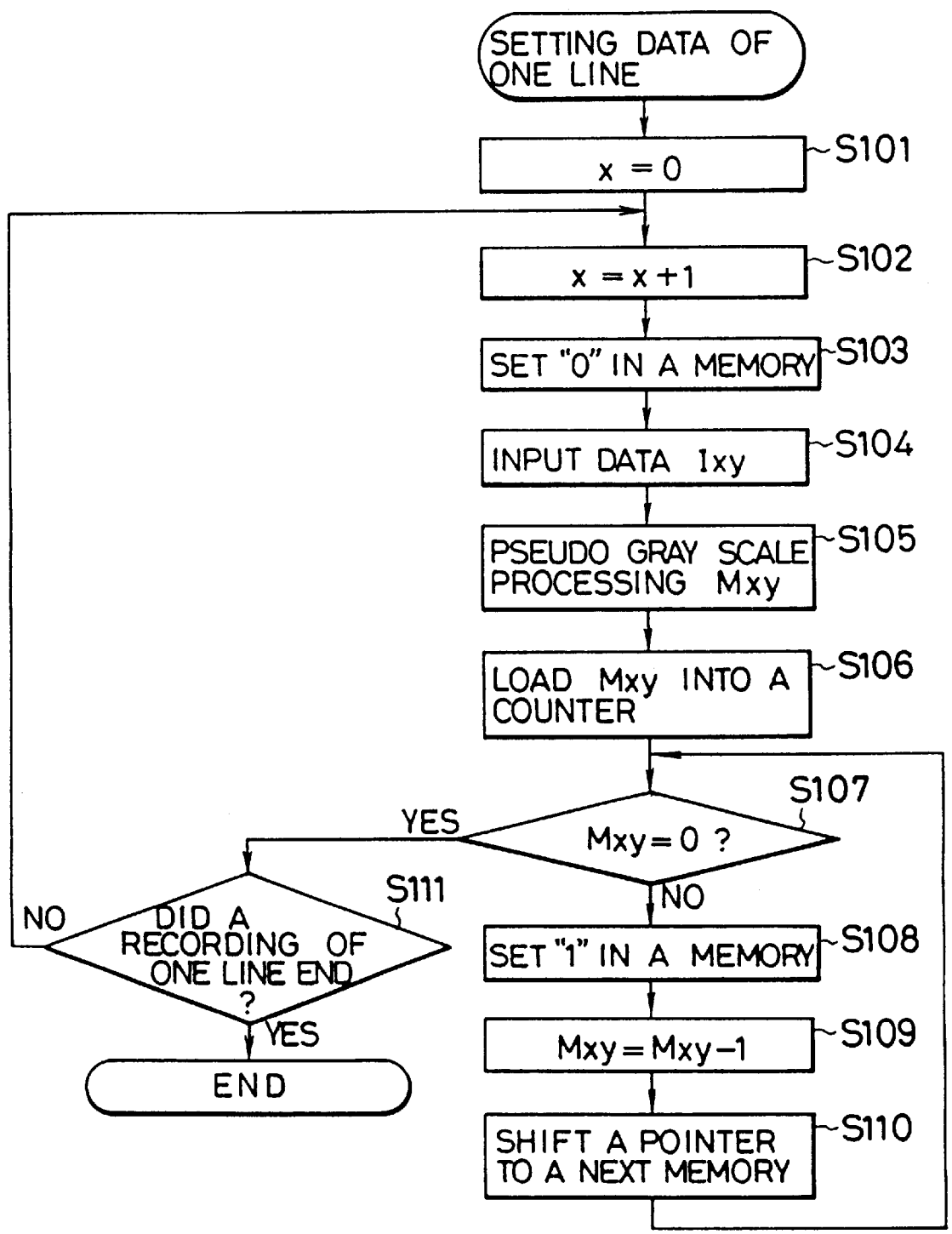
FIG. 11 is a flow chart showing procedures for setting driving data in the structure shown in FIG. 10.

FIG. 11 is a flow chart of procedures executed by the structure shown in FIG. 10.

The procedures shown in FIG. 10 are invoked when the data set processing is shifted to a new pixel at (x, y), and at first, a parameter x referring to the pixel address is initialized in step S101, and next, x is incremented by 1 in step S102. After these steps, designated nozzle memories 1 to 4 used for data setting are specifically assigned to ones for the new pixel at (x, y), to each of which "0" is set by the memory resetting 132 in step S103. Next, in step S104, the input data part 101 supplies the 8-bit input signal Ixy to the pseudo-halftoning processing part 140. Consequently in Step S105, the pseudo-halftoning processing part 140 outputs the 5-density level signal Mxy according the 8-bit input signal Ixy. The data of the signal Mxy are loaded on the counter 120 in step S106, and whether the value of Mxy is 0 or not is judged in step S107.

In the case that Mxy is 0, that is, an ink droplet is not ejected onto the pixel (x, y) of this data setting, procedures continues to step S111 and the termination of data settings with respect to a line of pixels is judged and step S102 is called again for requesting the input data part 101 to send the next signal data corresponding to the pixel at (x+1, y) and the above mentioned procedures are repeated.

In the case that the value of Mxy is not 0, in step S108, "1" is assigned to designated nozzle memory among those 1 to 4 to which the pointer 130 directs currently, by the memory setting 131. Next, in step S109, the new value Mxy is obtained by subtracting 1 from the current value of Mxy. In step S110, the pointer 130 is incremented so as to direct the next nozzle memory before going back to step S107. Step S108 to S110 are repeated until the value Mxy comes to be 0.

More specifically, in the designated nozzle memories corresponding to the pixel (x, y) of data setting, in the case of Mxy=0, a value "0" is set in all the nozzle memories 1 to 4, and in the case of Mxy=1, a value "1" is set in any one of nozzle memories 1 to 4 and value "0" is set in the rest of nozzle memories except one with a value "1". And furthermore, in the case that Mxy is 2 or 3, a value "1" is set in any 2 or 3 nozzle memories 1 to 4, and in the case of Mxy=4, a value "1" is set in all the nozzle memories 1 to 4.

In the above described procedures, data setting of "1" is, at first, performed to the nozzle memory next to the nozzle memory to which the pointer 130 directs lastly in the previous data setting for the pixel at (x−1, y). That is, a designated orifice for ejecting an ink droplet to the pixel of data setting is selected so that the number of orifices in which a value "1" is set in data settings in a set of pixels arranged on a line directed in the scanning direction of the recording head may be equal to that of orifices to which a value "1" is already set.

As for data setting of the first pixel on every line of pixels, it is allowed that, by storing the nozzle memory to which the pointer 130 directs lastly in the previous data settings of the array of pixels which are formed by using identical orifices, the data setting can be started from that nozzle memory, that is corresponding orifice to this memory of that identical orifices. According to this method for data setting, even in case of recording images including a plurality of lines of pixels, for example, a hole page of the recording sheet, a plurality of orifices can be used uniformly for ejecting ink droplets.

FIG. 12 is a schematic illustration illustrating functions of the above described structure shown in FIG. 10, showing a case of forming an image similar to FIG. 2 in this embodiment.

As the number of ejections of ink droplets to the pixel, for example, 301 is defined to be 1 by the output from the pseudo-halftoning processing part 140, a value "1" is set in the designated bit memory corresponding to the pixel 301 of the nozzle memory 1 which corresponds to the orifice No. 100. The number of ejections of ink droplets to the pixel 302 is similarly defined to be 1 by the output from the pseudo-halftoning processing part 140. However, as the nozzle memory 2 is assigned for the data setting of the pixel 302 by the pointer 130, a value "1" is set in the designated bit memory corresponding to the pixel 302 of the nozzle memory 2 which corresponds to the orifice No 68. This means that the pixel 302 is formed by an ink droplet ejected from the orifice No. 68 during the second scan 801B of the recording head. Regarding the data setting of the pixel 303, as the output from the pseudo-halftoning processing part is 0, the pointer 130 is not shifted and a value "0" is set into the corresponding memories of the nozzle memories 1 to 4, and then the data setting of the pixel 304 continues. The number of ejections of ink droplets to the pixel 304 is similarly defined to be 1 by the output from the pseudo-halftoning processing part 140. However, as the nozzle memory 3 of the orifice No. 36 is directed to by the pointer 130 in the data setting of the pixel 304, a value "1" is set in the designated bit memory of the nozzle memory 3.

In the similar manner, in data setting of each pixel, a designated orifice to be used for ejection is determined by setting the nozzle memory next to the nozzle memory currently directed by the pointer 130 in the last data setting of the pixel.

According to Embodiment 1A for forming pixels by the above describing data setting procedures, as found to be apparent in FIG. 12, orifices to be used for ejection is selected uniformly, specifically, each of the pixels between 301 and 309 is formed by using an identical orifice four times.

In contrast to this embodiment, according to prior art data setting methods, as shown in FIG. 2, the number of times using orifices No. 100, No. 68, No. 36 and Nos. 4 is 8, 5, 2 and 1, respectively, which means that specific orifices are mostly used.

By using orifices uniformly, even if there may be a little ejection failures, stable and uniform recorded images can be obtained, and further, the productivity of recording heads can be raised. The length of the lifetime of recording heads can be extended due to using orifices uniformly for ejection.

Embodiment 1B

Figure 13:
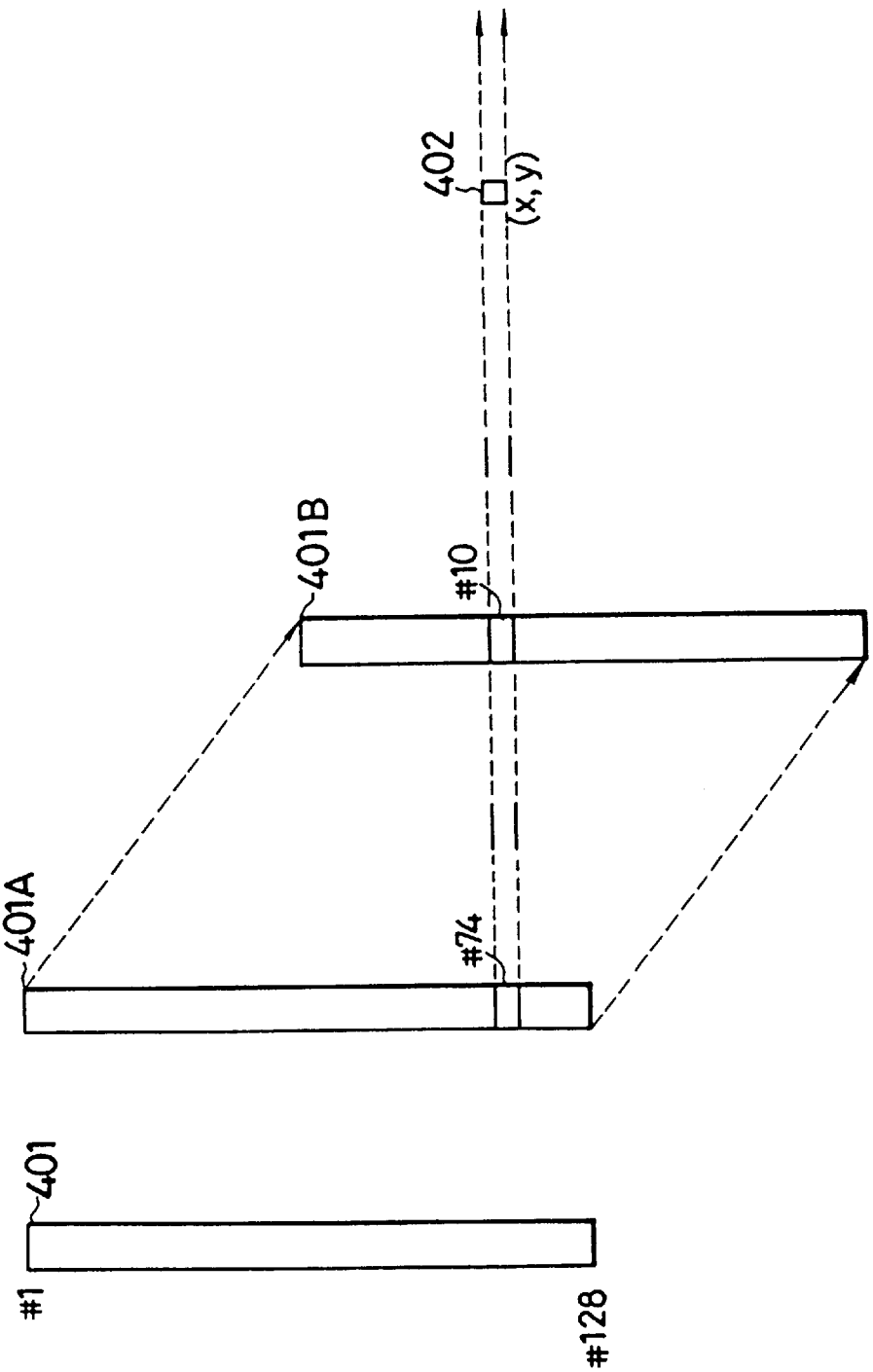
FIG. 13 is a schematic illustration illustrating a pixel forming method used in Embodiment 1B of the present invention.

FIG. 13 is a schematic illustration illustrating an image recording method of this embodiment. As shown in FIG. 13, for example, the pixel 402 at (x,y) is formed by ink droplets ejected from orifices No. 74 and No. 10 in two times scannings of the recording head 401 having 128 orifices. In this example, by enabling up to 2 times ejection from each orifice in its single scanning, images with 5 gray levels can be recorded with ejected ink droplets the number of which can be between 0 and 4. In addition, transporting the displacement of the recording sheet in the direction vertical to the scanning direction of the recording head in relative to the recording head 401, is equivalent to 64 (128/2) pitches of orifices. An image composed of pixels to be recorded by 128 orifices is recorded in two scannings of the recording head.

Figure 14:
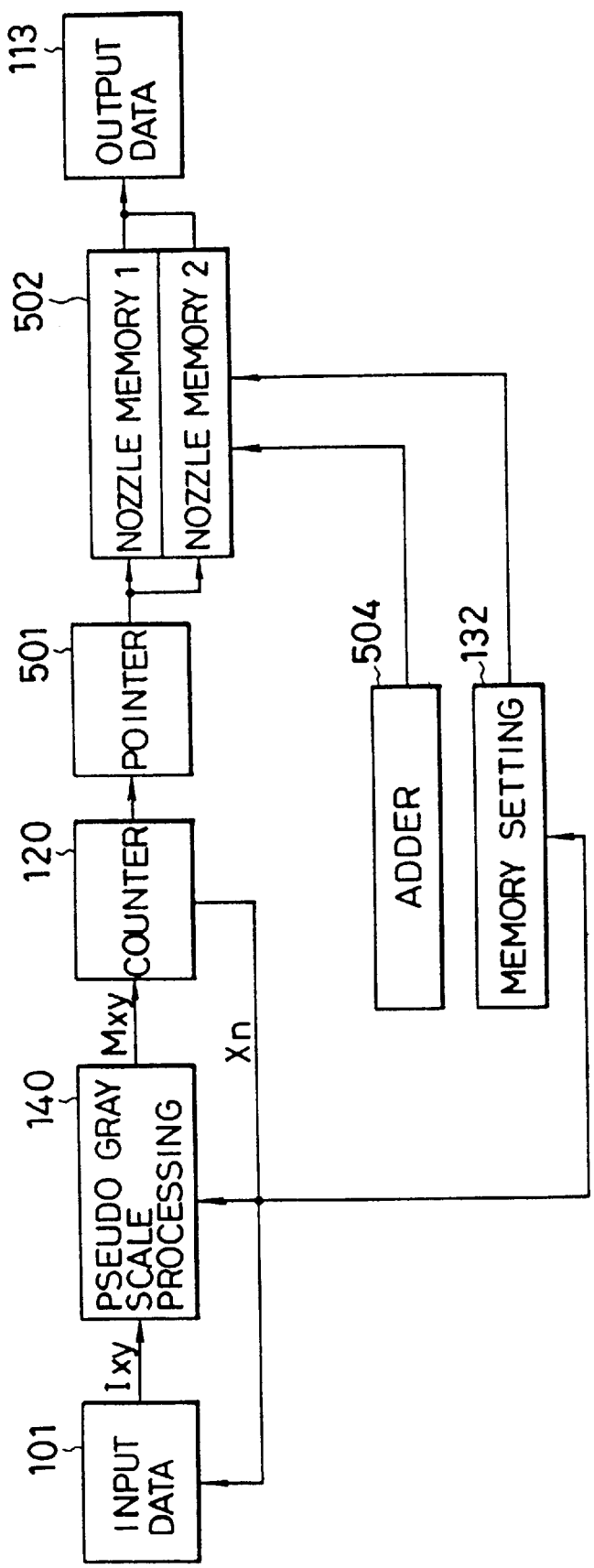
FIG. 14 is a block diagram showing a structure for setting driving data for an individual orifice in Embodiment 1B.

FIG. 14 is a block diagram similar to FIG. 10, representing a structure of ejection data setting in image signal processing of Embodiment 1B. Like parts used in FIG. 10 are designated like numbers and their details are abbreviated here.

In FIG. 14, the pointer 501 has function similar to the pointer 130 described in Embodiment 1A, and directs alternately to either of the nozzle memories 1 or 2 in the nozzle memory unit 502. Each of the nozzle memories 1 and 2 accommodates data of one line of pixels with 2-bit segment assigned to each pixel. The nozzle memory 1 corresponds to the orifice of the first scanning, for example in FIG. 13, the orifice No. 74, and the nozzle memory 2 corresponds to the orifice of the second scanning, for example in FIG. 13, the orifice No. 10. Reference numeral 504 denotes an adder for adding 1 to data stored in each of the nozzle memories 1 and 2.

Figure 15:
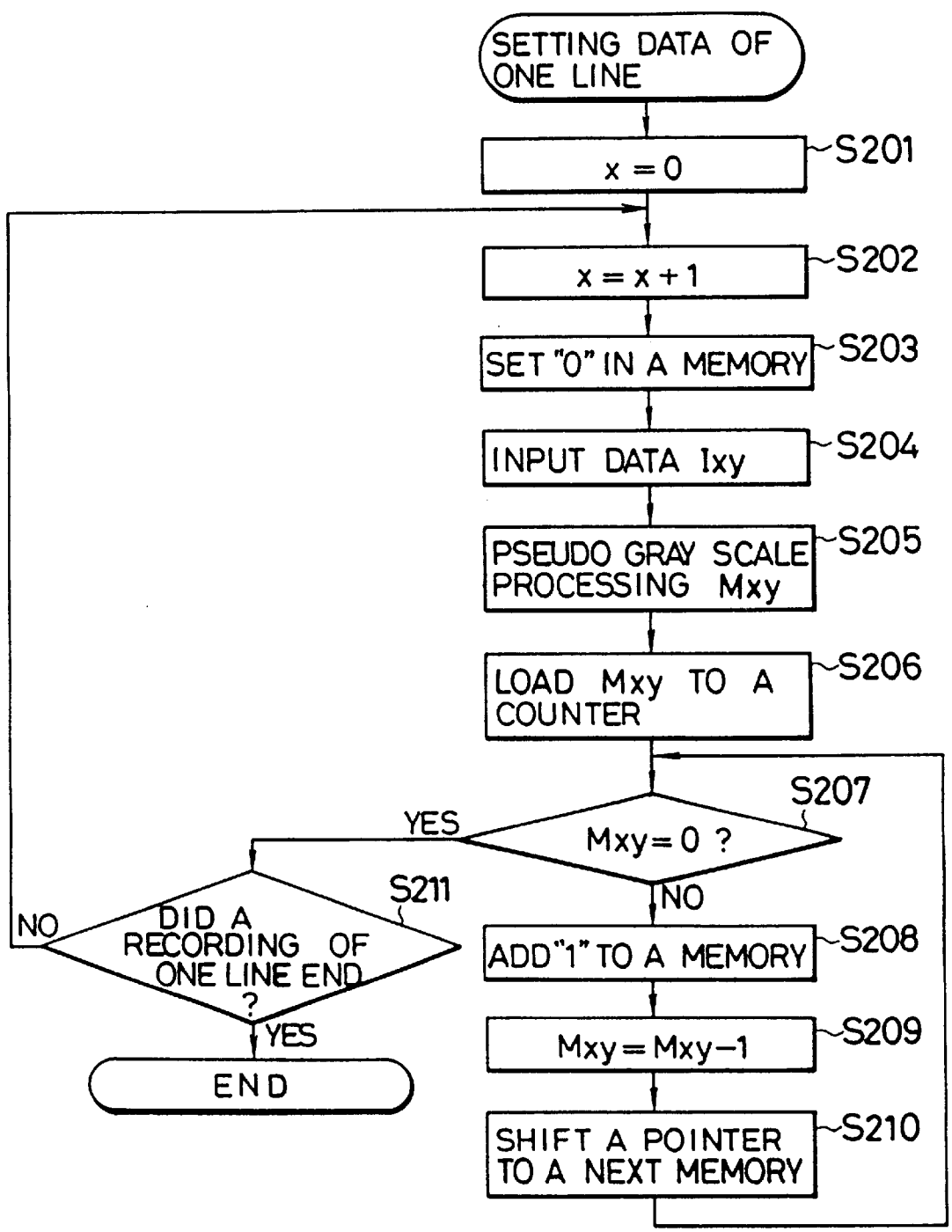
FIG. 15 is a flow chart showing procedures for setting driving data in the structure shown in FIG. 14.

FIG. 15 is a flow chart executed by the structure shown in FIG. 14. The procedures shown in FIG. 15 are almost similar to those shown in FIG. 11, and hence in the followings, their differences are described.

If the number of ejected ink droplets to a pixel, Mxy, is judged not to be 0 in step S207, the adder 504 adds "1" to the memory of data setting in either of nozzle memories 1 or 2 currently directed by the pointer 501 in step S208.

According to procedures in FIG. 15, in the case of Mxy=0, a value "0" is set into the designated memory in one of the nozzle memories 1 and 2 corresponding to a specified pixel. In the case of Mxy=1, a value "1" is set into the designated memory in one of the nozzle memories 1 and 2 corresponding to a specified pixel and a value "0" is set into the designated memory of the other of the nozzle memories 1 and 2 corresponding to a specified pixel. In the case of Mxy=2, a value "1" is set into the designated memories in both of the nozzle memories 1 and 2 corresponding to specified pixels. In the case of Mxy=3, a value "2" is set into the designated memory of one of the nozzle memories 1 and 2 corresponding to a specified pixel and a value "1" is set into the designated memory of the other of the nozzle memories 1 and 2 corresponding to a specified pixel. In the case of mxy=4, a value "2" is set into the designated memories in both of the nozzle memories 1 and 2 corresponding to specified pixels.

According to data setting of this embodiment, similarly to Embodiment 1A, data setting for forming pixels is performed so that the orifice other than the orifices used lastly for forming the previous pixel may be used at first for forming a pixel of current data setting. Owing to this data setting method, a couple of orifices used for forming an identical single pixel can be used uniformly for ejection.

FIG. 16 is a schematic illustration of an exemplary series of pixels showing the above described pixel data setting.

As found in FIG. 16, each of pixels 701 to 709 are formed with ink droplets the number of which is respectively shown in its corresponding symbol representing a pixel and the orifices No. 74 and No. 10 are alternately used. As a result, in forming 9 pixels, the number of ejections from orifices No. 74 and No. 10 is an identical 8 times, to each other, respectively, and hence, the occurrence of ejections from orifices can be evened.

Using structures described in embodiments 1A and 1B, in case that failed orifices of the recording head can be specified priorly, designated failed orifices can be selected not to be used but substituted for other orifices for ejecting ink droplets for recording images.

Embodiment 2

FIGS. 17 and 18A to 18D are schematic illustrations showing data stored in the frame memory 100M and the driving data RAM 110M, both shown in FIG. 4, in the structure of Embodiment 2. In Embodiment 2, a pixel is formed in the similar manner of scanning to that shown in FIG. 1, and exceptionally, the number of ink droplets ejected on a single pixel is one which is different from the above embodiments shown in FIGS. 1, 1A and 1B in which a plurality of ink droplets are ejected on a single pixel.

Figure 17:
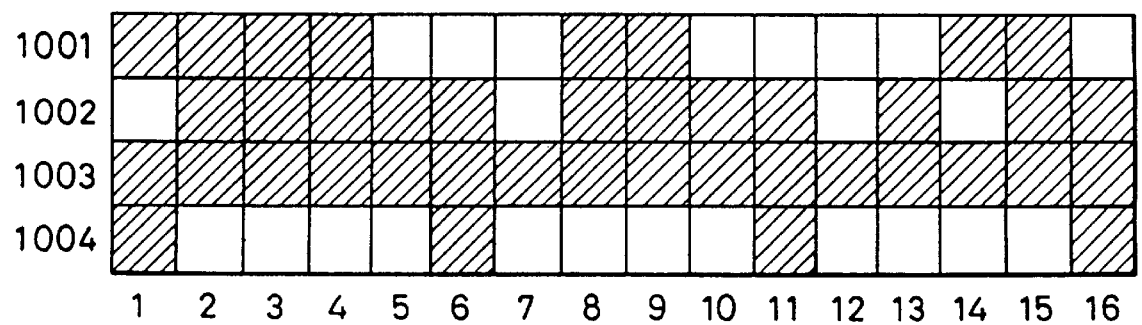
FIG. 17 is a schematic illustration showing data stored in a frame memory 100M of Embodiment 2 of the present invention.

FIG. 17 shows a part of the frame memory 100M, in which a single square represents a single pixel in each of which a bit signal or data is set and specifically, a pixel expressed by a hatched square is given a bit signal "1" and specified as being used for ejection of an ink droplet. After all, FIG. 17 shows a dot pattern developed by ejected ink droplets, that shows an image recorded on the recording sheet. In FIG. 17, each of reference numerals 1001, 1002, 1003 and 1004 denote series of pixels arranged in an array directing to the head scanning direction, respectively. Reference numerals 1 to 16 represent pixel numbers of each of pixels arranged in the series of pixels.

FIGS. 18A to 18D show a part inside the driving data RAM 110 in each step of scanning of the recording head, respectively. A single square represents a single pixel in each of which a bit signal determining whether or not an ink droplet is ejected is set, and specifically, a pixel expressed by a hatched square is given a bit signal "1" and specified as being used for ejection of an ink droplet. Each of numbers prefixed by # are directed to each of orifices accompanied by a series of pixels formed by its corresponding orifice. Reference numerals 1 to 16 represent pixel numbers of each of pixels arranged in the series of pixels. In other words, FIGS. 18A, 18B, 18C and 18D show contents of the driving data RAM 110M, for example, corresponding to scannings 801A, 801B, 801C and 801D, respectively.

A series of pixels 1001 shown in FIG. 17 are formed by ink droplets ejected from orifices No. 97, No. 65, No. 33 and No. 1 in scannings of 801A, 801B and 801D, respectively. A series of pixels 1002 are formed by ink droplets ejected from orifices No. 98, No. 66, No. 34 and No. 2 in scannings of 801A, 801B, 801C and 801D, respectively. A series of pixels 1003 are formed by ink droplets ejected from orifices No. 99, No. 67, No. 35 and No. 3 in scannings of 801A, 801B, 801C and 801D, respectively. A series of pixels 1004 are formed by ink droplets ejected from orifices No. 100, No. 68, No. 36 and No. 4 in scannings of 801A, 801B, 801C and 801D, respectively.

Figure 19:
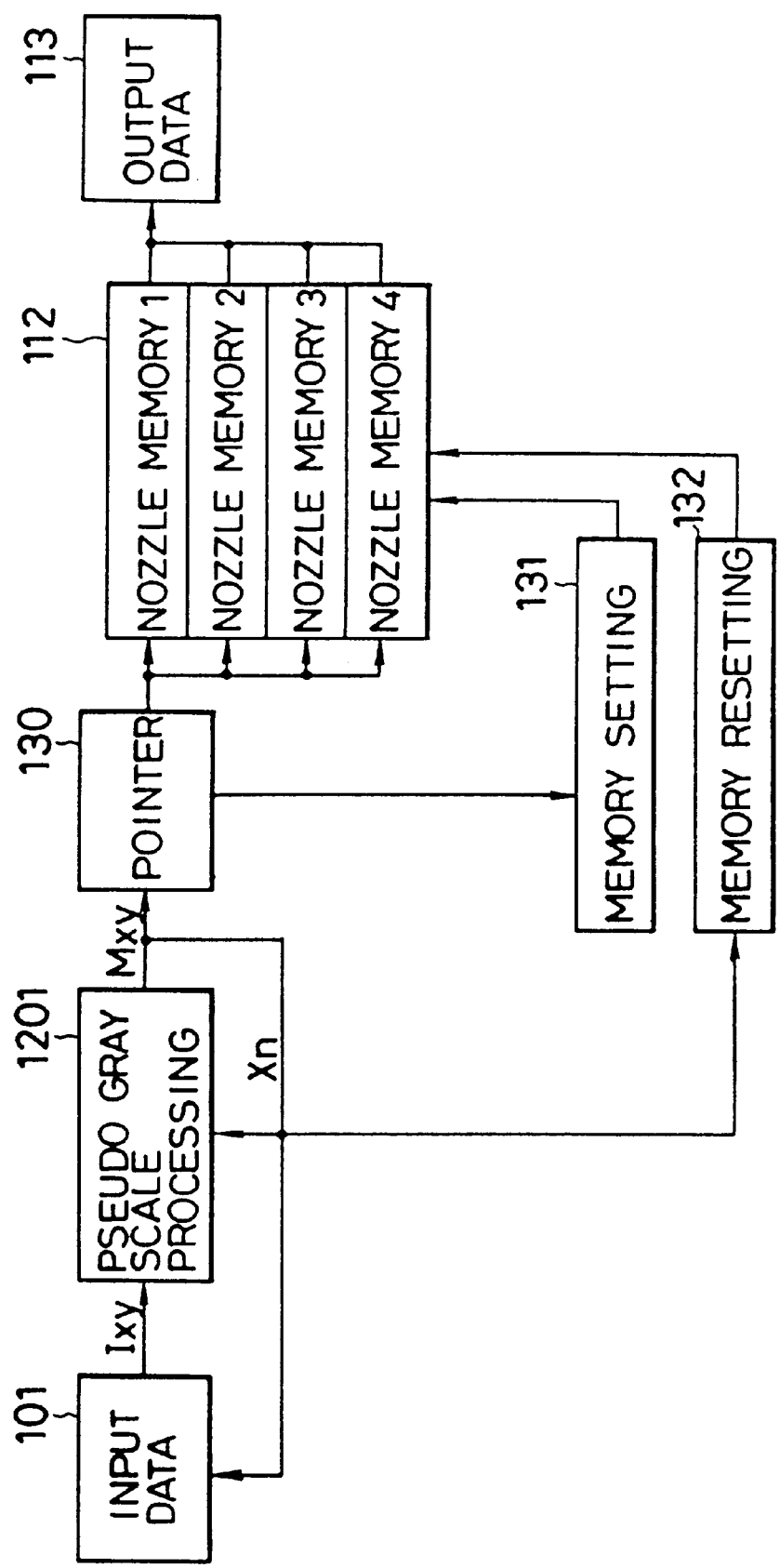
FIG. 19 is a block diagram showing a structure for setting driving data for an individual orifice in Embodiment 2.

FIG. 19 is a block diagram of the structure of Embodiment 2, where like parts used in FIG. 10 are designated like numbers and their details are abbreviated here.

Figure 18A:
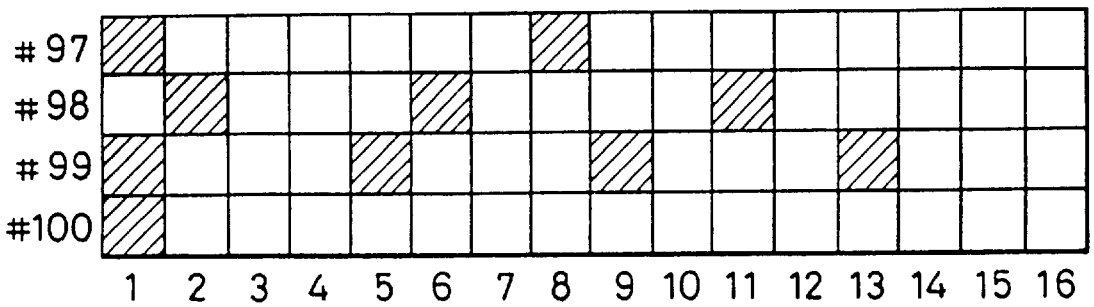
FIGS. 18A, 18B, 18C and 18D are schematic illustrations showing data stored in a driving data RAM 100M of Embodiment 2.
Figure 18B:
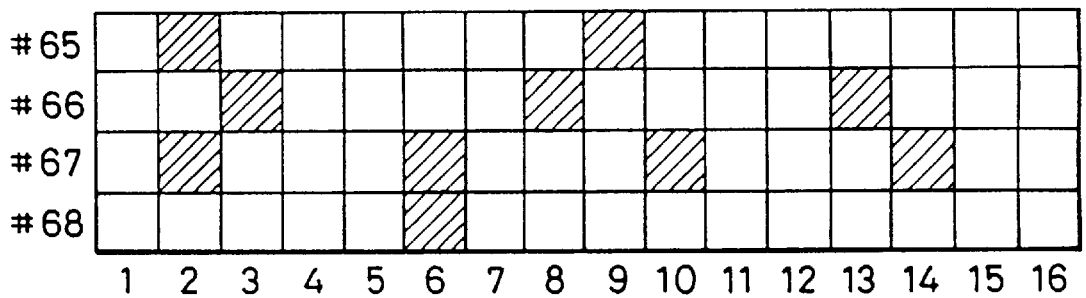
Figure 18C:
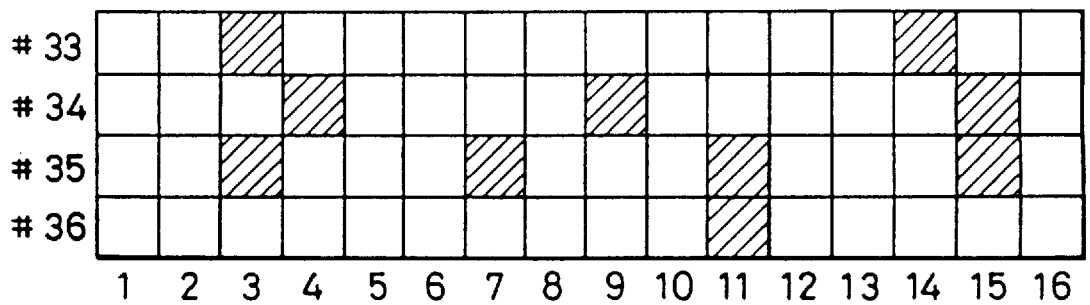
Figure 18D:
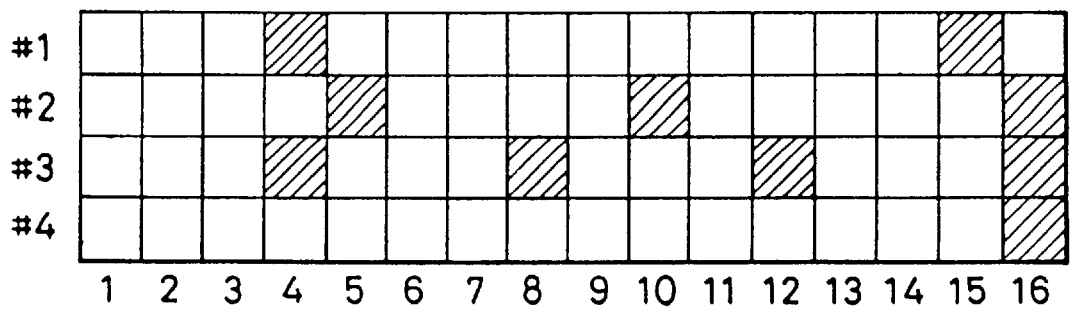

A different feature of this embodiment from the structure shown in FIG. 10 is that the output from the pseudo-halftoning processing part 1201 is density level data of two levels while the output from the the pseudo-halftoning processing part in FIG. 10 is density level data of five levels, that is, the value of Mxy in FIG. 19 is "0" or "1". Therefore, in this embodiment, the counter is not required after the pseudo-halftoning processing part 1201. In the case that the value of the output Mxy from the pseudo-halftoning processing part 1201 is "0", the pseudo-halftoning processing part 1201 outputs a signal Xn representing that the pixel of data processing is shifted to the next one to parts of this structure shown in FIG. 19. In the case that the value of the output Mxy is "1", the value "1" is stored in the nozzle memory directed by the pointer 130 through the memory setting 131, the pointer 130 is incremented by 1, and the pixel of data processing is shifted to next one. Each of nozzle memories 1, 2, 3 and 4 is a 1-bit memory, and specifically in this embodiment, at data setting of a pixel at (x, y), the value "1" is stored in only one of these nozzle memories directed by the pointer 130. The output data from the pseudo-halftoning processing part 1201 is those shown in FIG. 17 is stored in the frame memory 100M. The data in the frame memory 100 is read out in the order of the arrangement of pixels in the direction of a series of pixels and is processed by the structure shown in FIG. 19, and finally the data is transferred to a memory prepared for each scanning as shown in FIGS. 18 to 18D.

Now referring to FIGS. 17 to 18, what is explained is how to store data specific to a series of pixels 1004 in a memory corresponding to each orifice. Suppose that the pointer 130 initially directs to the nozzle memory 1, and that the nozzle memory 1 is for the orifice No. 100, the nozzle memory 2 is for the orifice No. 68, the nozzle memory 3 is for the orifice No. 36 and the he nozzle memory 4 is for the orifice No. 4. At first, in defining the pixel 1 at the top of a series of pixels 1004, the value "1" is stored in the nozzle memory 1 directed by the pointer 130 through the memory setting 131 in order to eject an ink droplet onto the pixel 1, and after this, the pointer 130 is incremented in order to direct the nozzle memory 2 next. That is, the value "1" is set at the position in the memory corresponding to the pixel 1 of the orifice 100 shown in FIG. 18A so that the pixel 1 is formed by an ink droplet ejected from the orifice 100 in the scanning 801A. While defining pixels 2 to 5, as ejections of ink droplets do not occur, the pointer 130 maintains its direction to the nozzle memory 2, and hence "0" is set in each of pixels 2 to 5 in each of scannings shown in FIGS. 18A to 18D by the memory resetting 132. Next, the pixel 6 is taken for the next data setting, as an ink droplet is required to be ejected onto the pixel 6, the value "1" is set in the nozzle memory 2 directed by the pointer 130 through the memory setting 131, and after this, the pointer 130 is incremented so as to directs to the next nozzle memory 3, that is, the value "1" is set in the position in the memory corresponding to the pixel 6 at the orifice No. 68 in FIG. 18B, and then an ink droplet ejected from the orifice No. 68 in the scanning 801B is used for forming the pixel 6. While defining pixels 7 to 10, as ejections of ink droplets do not occur, the pointer 130 maintains its direction to the nozzle memory 3, and hence the value "0" is set in the position corresponding to each of pixels 7 to 10 in each of scannings shown in FIGS. 18A to 18D by the memory resetting 132.

Next, the pixel 11 is taken for the next data setting, as an ink droplet is required to be projected onto the pixel 11, the value "1" is set in the nozzle memory 3 directed by the pointer 130 through the memory setting 131, and after this, the pointer 130 is incremented so as to directs to the next nozzle memory 4. That is, the value "1" set in the memory corresponding to the pixel 11 of the orifice No. 36 in FIG. 18C, and then an ink droplet ejected from the orifice No. 36 in the scanning 801C is used for forming the pixel 11.

While defining pixels 12 to 15, as ejections of ink droplets do not occur, the pointer 130 maintains its direction to the nozzle memory 4, and hence the value "0" is set in the memory corresponding to each of pixels 12 to 15 in each of scannings shown in FIGS. 18A to 18D by the memory resetting 132. Next, the pixel 16 is taken for the next data setting, as an ink droplet is required to be ejected onto the pixel 16, the value "1" is set in the nozzle memory 4 directed by the pointer 130 through the memory setting 131, and after this, the pointer 130 is incremented so as to directs to the next nozzle memory 1. That is, the value "1" is set in the memory corresponding to the pixel 16 of the orifice No. 4 in FIG. 18D, and ten an ink droplet ejected from the orifice No. 4 in the scanning 801D is used for forming the pixel 16.

So far, a series of pixels 1004 are formed by ejections from orifices No. 100, No. 68, No. 36 and No. 4 to their designated pixels.

According to Embodiment 2 in which images with 2 gray levels are formed, as found to be apparent from FIGS. 18A to 18D, orifices No. 100, No. 68, No. 36 and No. 4 are used uniformly for forming a series of pixels, and thus, the occurrence of ejections from orifices can be evened. By using orifices uniformly, even if there may be a little ejection failures, stable and uniform recorded images can be obtained, and further, the productivity of recording heads can be raised.

As in FIG. 3 describing a diagrammatic picture of the major part of the ink jet recording apparats, the ejection frequency is defined to be 2 KHz. The scanning speed of the carriage 4 is determined in responsive to this ejection frequency. In each of embodiments of the present invention, assuming that the ejection frequency of the recording head is about 2 KHz and that the recording frequency of pixels to be recorded is 2 KHz similar to an ordinary recording frequency, as the pixel frequency of each scanning divided into a quarter of the generic scanning scheme is estimated to be 8 KHz, it is allowed that the carriage speed may be four times as large as that in the ordinary scanning scheme in order to maintain the generic recording speed. Though it seems that the recording time increases by four times that of the generic recording time in order to record pixels increasing by four times, the recording time can be maintained to be the original value by increasing the carriage speed by four times.

Embodiment 3

Figure 20:
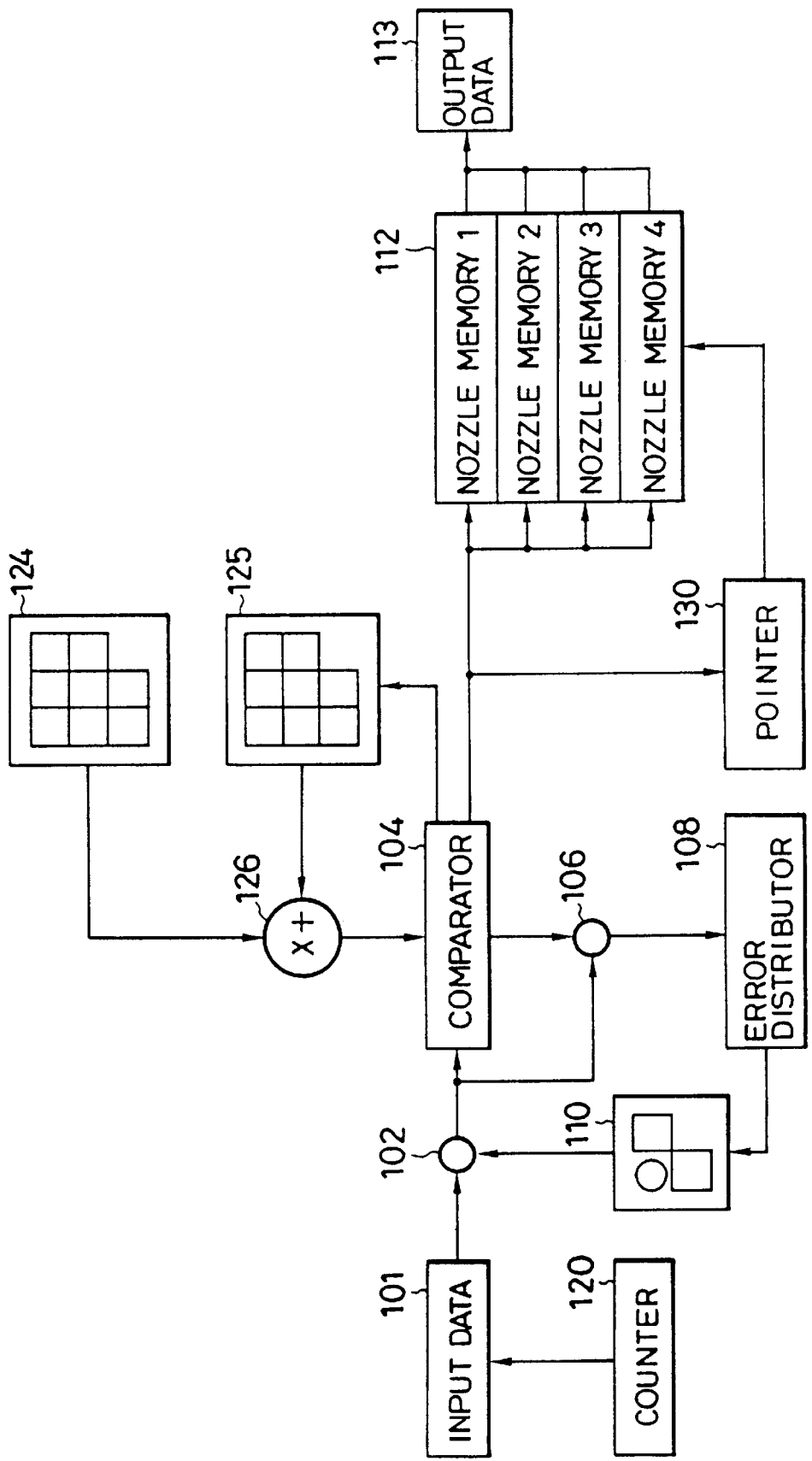
FIG. 20 is a block diagram showing a structure for image signal processing and assigning driving data in Embodiment 3 of the present invention.

FIG. 20 is a block diagram showing a structure for processing image data of Embodiment 3 of the present invention, and the structure is similar to that of Embodiment 1 shown in FIG. 10 except a structure for the pseudo-halftoning processing. The different structure for the pseudo-halftoning processing will be described below.

In FIG. 20, when the processing of the specified pixel (x,y) is started, the input data I(x,y) of the specified pixel is transferred to an adder 102. At this time the value of a counter 120 is 3, thus the pointer 130 points a memory 1. In order to obtain I'(x1,y1), I(x,y) is added in the adder 102 to the data from an error memory 110 that stores errors from the pseudo-pixel in which the two-level halftoning processing had been finished. On the other hand, the mean density is calculated in a multiplying and adding circuit 126 on the basis of the values from a weighting coefficient memory 124 and a pseudo-pixel memory 125 which stores the two-level data each corresponding to the pixel which the two-level halftoning processing has been performed. A comparator 104 compares the result of calculation in the multiplying and adding circuit 126 with the data I'(x1,y1) from the adder 102, and output either "0" or "1". At this time, the pointer 130 points the memory 1, thus, the result of comparison in the comparator 104 is stored in the nozzle memory 1. When the result represents the value "1", the nozzle memory to which the pointer directs is shifted to the nozzle memory 2, and when the result is "0", the nozzle memory directed is not changed. The two-level comparison result is also stored in the pseudo-pixel memory 125. At the same time, an error between the output I'(x1,y1) and 0 or 255, which correspond to the comparison result "0" or "1" respectively, is calculated by a subtractor 106, and its difference is transferred to an error distributor 108, which distributes at a predetermined ratio and causes them to store in a memory section corresponding to the pseudo-pixels (x2,y2) and ((x+1)1, y1) of an error memory 110. The value in the memory may be used when their pixels are performed pseudo-halftoning processing.

Next, the counter 120 counts down by 1 and the value of the counter 120 comes to be 2. The input data I(x,y) of the specified pixel are outputted from input data 101. Accordingly, the processing of the pseudo-pixel (x2,y2) of the specified pixel (x,y) is started, a series of the two-level halftoning processing described above is repeated, and the processing result is stored in the nozzle memory to which the pointer 130 directs. When the series of the two-level halftoning processing of the pseudo-pixel (x2,y2) are completed, the counter 120 counts down by 1 again. The series of the above processing is repeated until the count of the counter 120 becomes zero, that is, it means that as to the specified pixel (x,y), the two-level halftoning processing of each pseudo-pixel is performed four times. As a result, either "0" or "1" is stored in each memory of a nozzle memory unit 112, thus the values of the nozzle memory 1 to 4 are outputted through output data 113 during scanning of each of recording heads.

Figure 21:
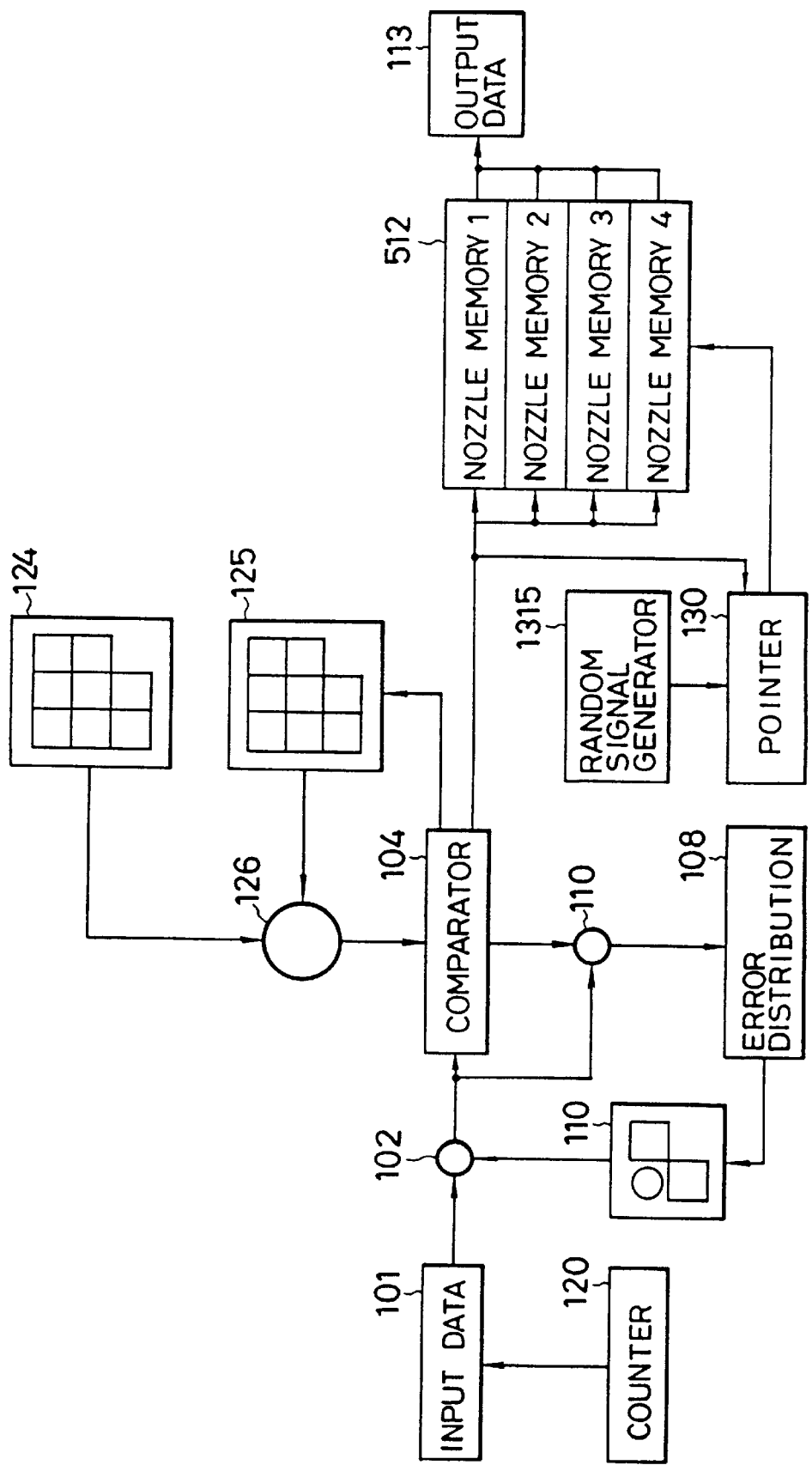
FIG. 21 is a block diagram showing a structure for image signal processing and assigning driving data in a modification of Embodiment 3 of the present invention.
Figure 22:
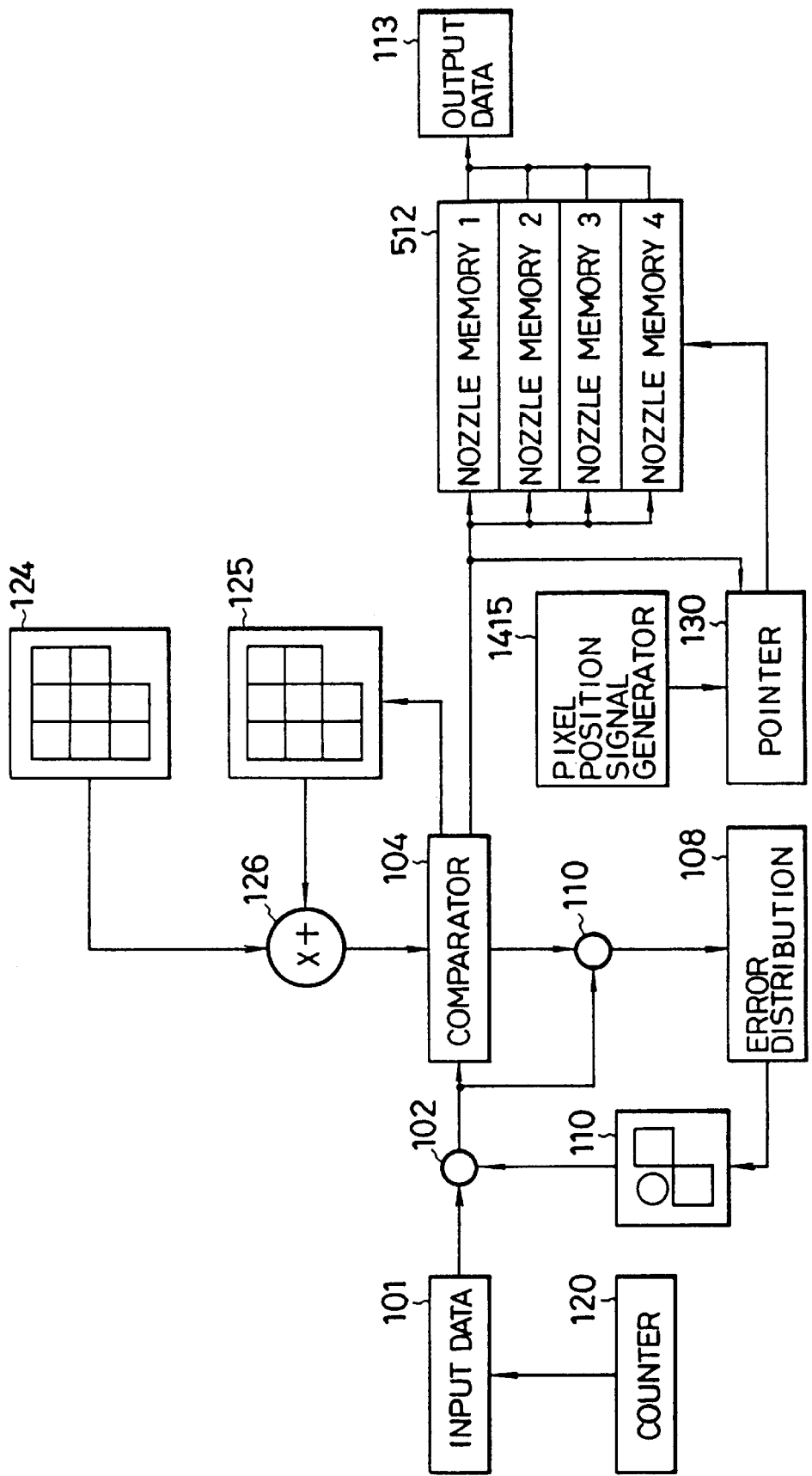
FIG. 22 is a block diagram showing a structure for image signal processing and assigning driving data in another modification of Embodiment 3 of the present invention.

As another structure with the same effect as that given by the above embodiments, as shown in FIG. 21, it is allowed that a nozzle memory directed by the pointer 130 may be selected by signals from a random signal generator 1315. With this structure, in the pseudo-halftoning processing, the nozzle memory to be directed can be selected randomly. In addition, yet another structure may be possible by forming that, as shown in FIG. 22, signals from a pixel position signal generator 1415 specifying the pixel position are used for directing a nozzle memory at the beginning of specifying a designated pixel.

Figure 23:
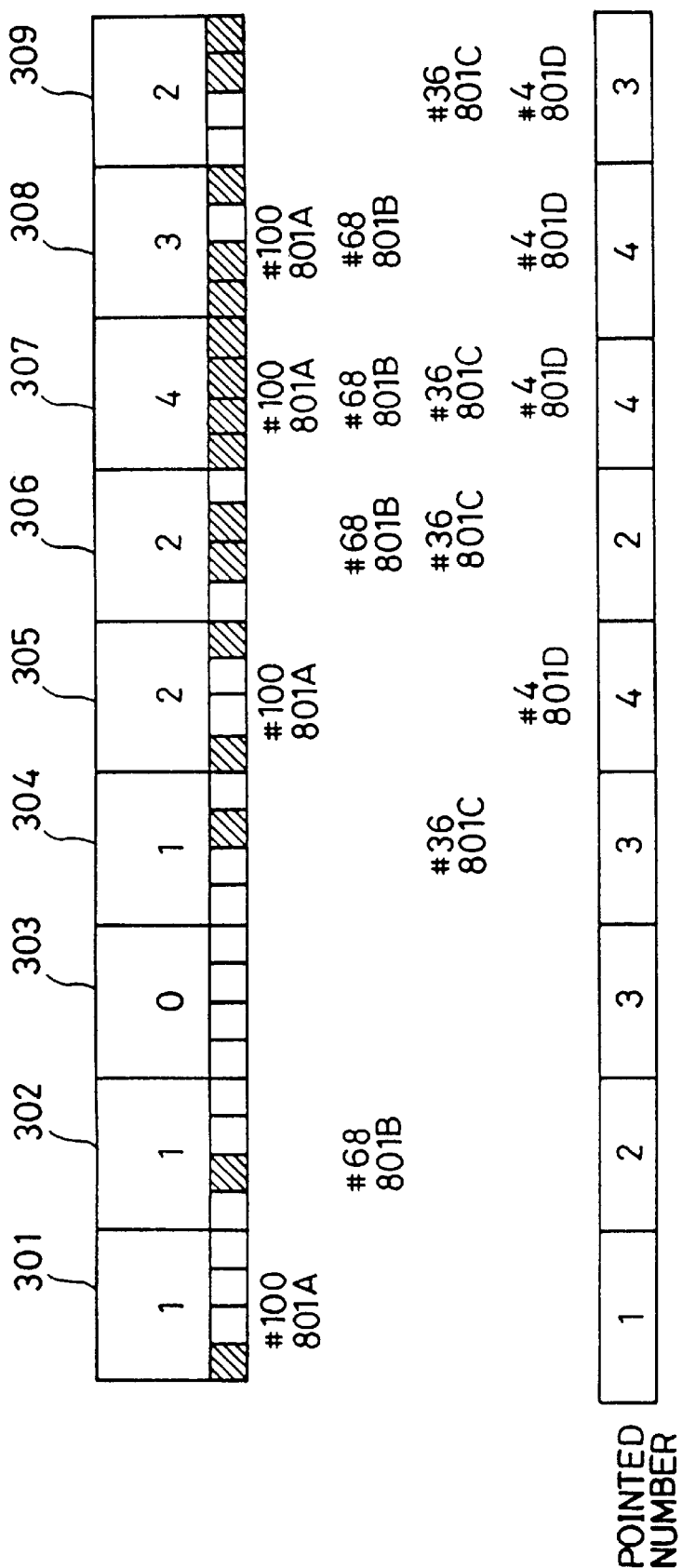
FIG. 23 is a schematic illustration showing the number of ink ejections, used orifices and scanning numbers in forming pixels in embodiment shown in FIG. 20.
Figure 24:
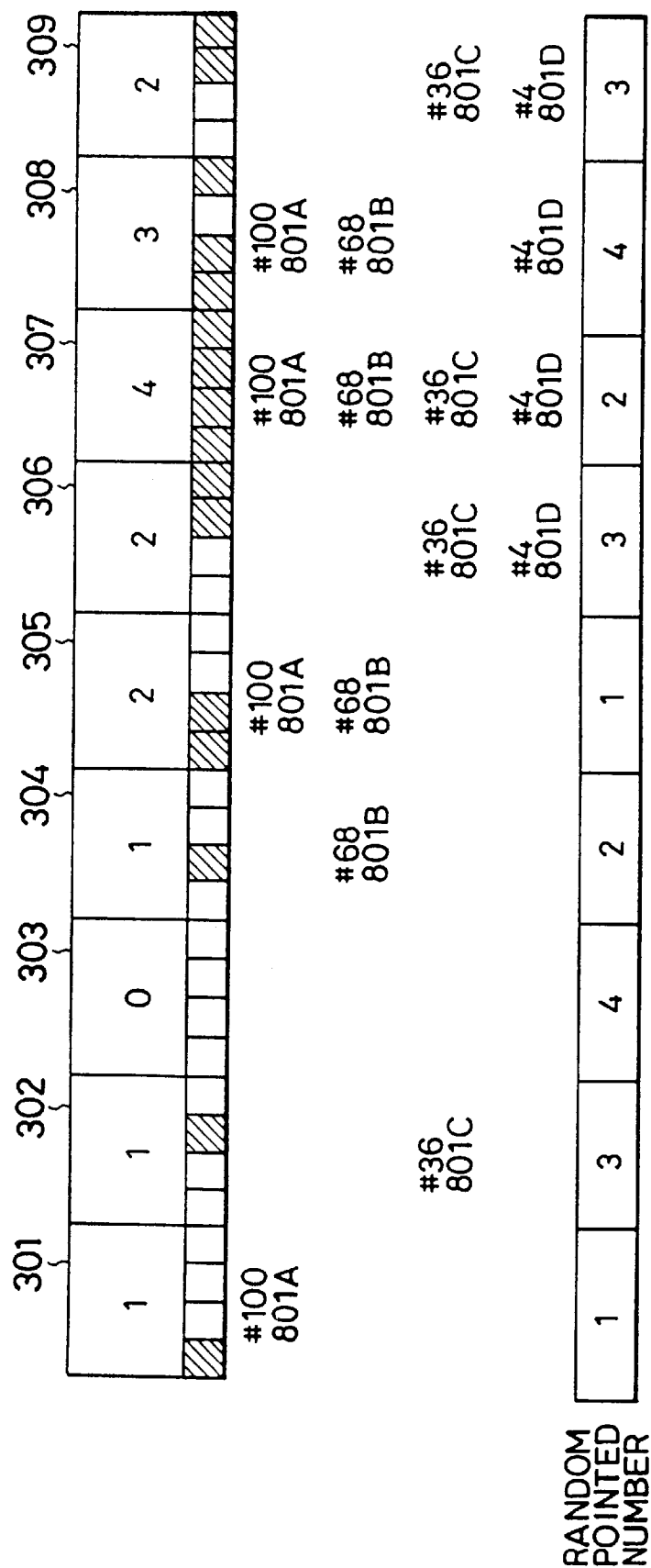
FIG. 24 is a schematic illustration showing the number of ink ejections, used orifices and scanning numbers of the recording head in forming pixels in embodiment shown in FIG. 21.
Figure 25:
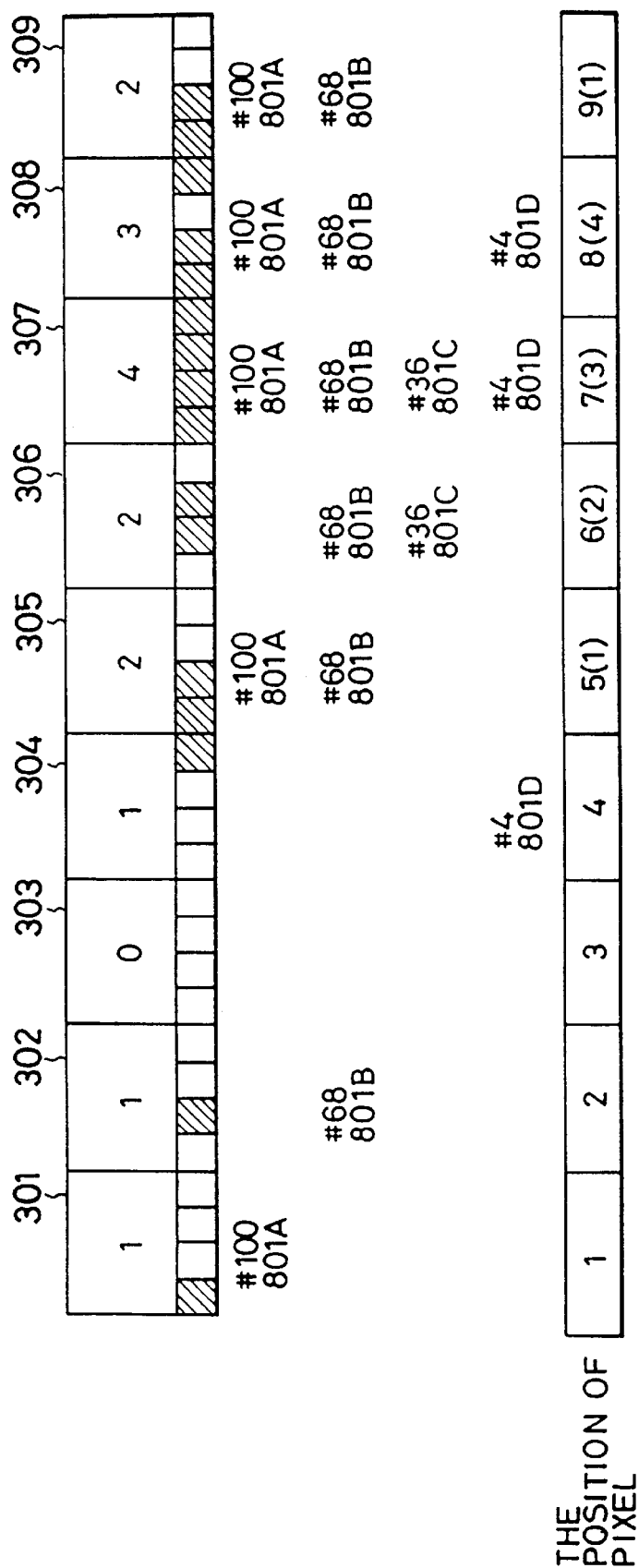
FIG. 25 is a schematic illustration showing the number of ink ejections, used orifices and scanning numbers in forming pixels in embodiment shown in FIG. 22.

FIGS. 23, 24 and 25 are schematic illustrations showing a pixel layout with respect to corresponding orifices and scannings assigned to each pixel in the structure shown in FIGS. 19, 20 and 21. As found to be apparent from FIGS. 23, 24 and 25, specific orifices are not mostly used but all the orifices are used for ejection uniformly.

Embodiment 4

In case of recording color images by the recording method described in the embodiments 1, 1A and 1B, the following improvements are required.

Figure 26A:
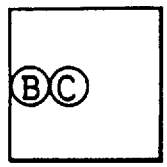
FIGS. 26A through 26P are schematic illustrations showing an example of ink dot patterns in recording colored images.
Figure 26E:
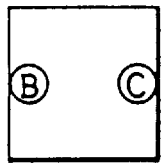
Figure 26I:
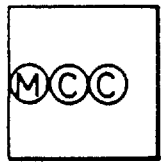
Figure 26M:
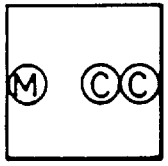
Figure 26B:
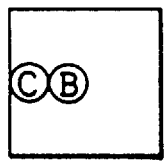
Figure 26F:
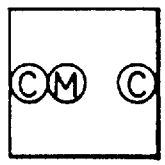
Figure 26J:
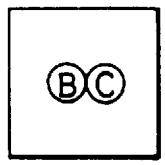
Figure 26N:
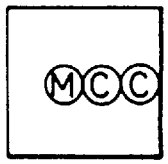
Figure 26C:
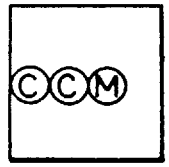
Figure 26G:
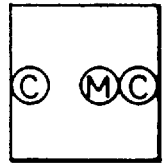
Figure 26K:
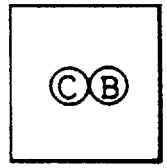
Figure 26O:
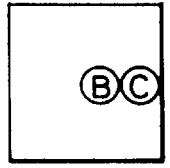
Figure 26D:
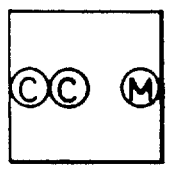
Figure 26H:
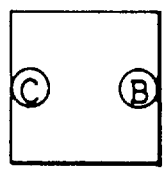
Figure 26L:
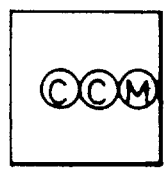
Figure 26P:
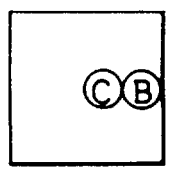

Suppose that color images are recorded by using a cyan ink fluid, a magenta ink fluid, a yellow ink fluid and a black ink fluid. FIGS. 26A through 26P are schematic illustrations showing dot patterns ejected onto a single pixel for expressing a light tone of blue by ejecting two ink droplets of cyan ink fluid and a single ink droplet of magenta ink fluid onto a single pixel in three times scannings of the recording head.

In FIGS. 26A through 26P, reference numerals 501 to 516 respectively denote dot patterns composed of ink droplets expressing a light tone of blue on a single pixel. A letter C enclosed in a circle refers to the position on which an ink droplet of a cyan ink fluid is ejected in the pixel, and a letter M enclosed in a circle refers to the position on which an ink droplet of a magenta ink fluid is ejected in the pixel. A letter B enclose in a circle refers to the position on which a couple of cyan ink droplets and magenta ink droplets are ejected in the pixel.

In the case that orifices are used sequentially for ejecting ink droplets onto a single pixel and the positions of dots defined by ink droplets ejected onto the single pixel are shifted from dot to dot, as shown in FIGS. 26A through 26P, there are 16 dot patterns 501 to 516 even for defining a pixel composed of a couple of cyan ink droplets and a single magenta ink droplet. Thus, a uniform light tone of blue may not be always obtained precisely because the tone is dependent on the dot pattern determined by the combination of orifices used for ejecting ink droplets.

For example, in the case of recording images composed of pixels all of which have a light tone of blue, under the condition that orifices are assigned sequentially to each of pixels to be recorded, for example, the pixel pattern (501) is formed next to the pixel pattern (516), and the pixel pattern (514) is formed next to the pixel pattern (501). In such a case, a couple of adjacent pixels are composed of different dot patterns and hence, have different color tones in spite of trying to express an identical color tone in adjacent pixels and therefore, a precise color tone cannot be defined in the whole images.

The above problem that a precise color tone cannot be defined in the whole images is not limited to the case of using a couple of cyan ink droplets and a single magenta ink droplets. So far, more complex and delicate color mixtures cannot be attained by the above described recording method, and if a precise color definition cannot be established in each of the pixels of the recorded image, a desirable recorded image cannot be obtained.

Embodiment 4 refers to a structure making it possible to eject ink droplets of different color onto an identical position within a pixel, in case of forming a pixel by ejecting several different color inks. Owing to this structure, as it will be appreciated that the number of possible pixel patterns defined by the same combination of ink colors and the number of ink droplets can be reduced, differences of color tones between pixel patterns can be reduced.

Figure 27:
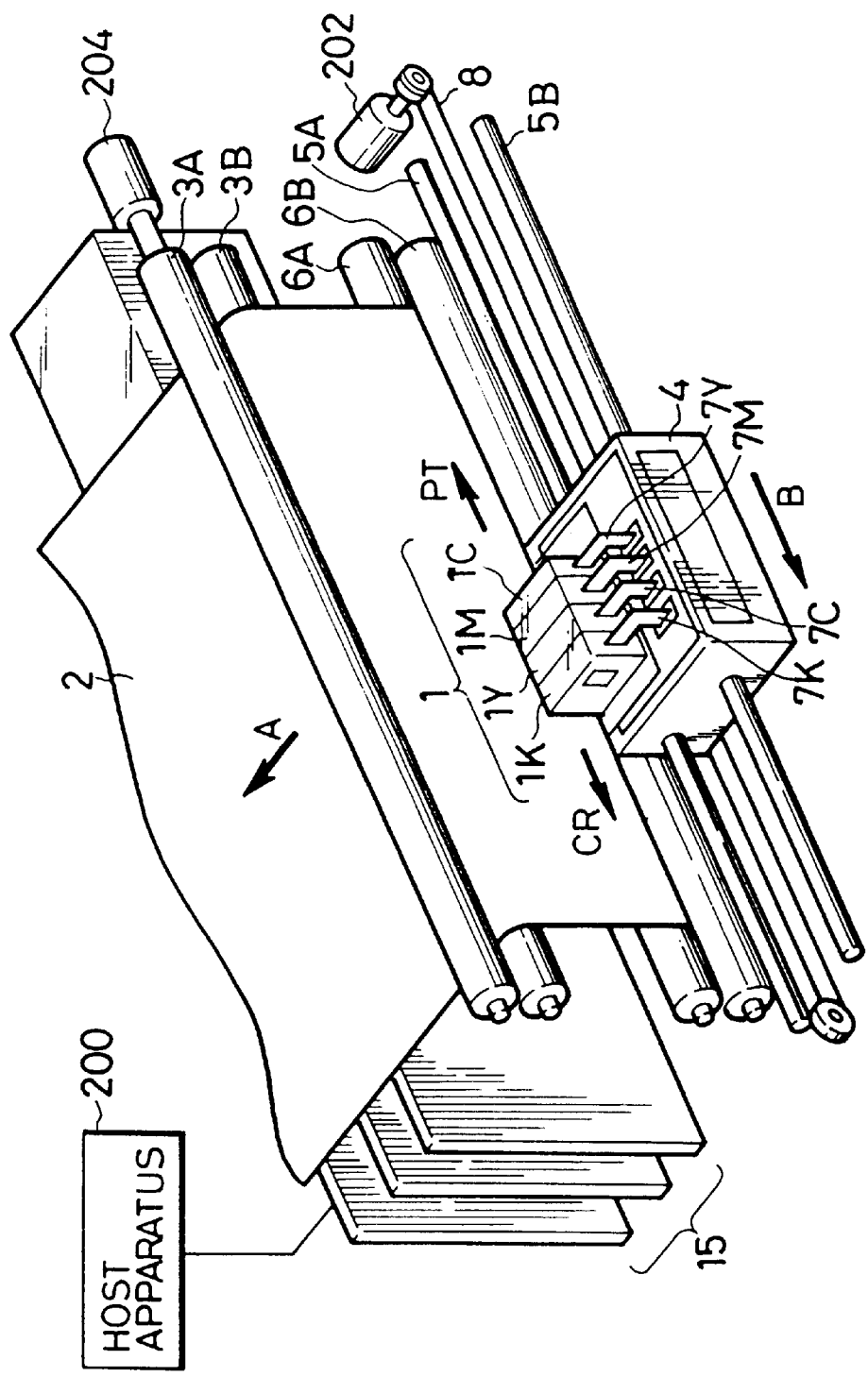
FIG. 27 is a schematic perspective view of the ink jet recording apparatus in Embodiment 4 of the present invention.

FIG. 27 is a diagrammatic perspective view showing major part of an ink jet recording apparatus of Embodiment 4. In FIG. 27, in each of the recording heads 1C, 1M, 1Y and 1K, for example, 128 orifices with their mutual interval being 63.5 μm are disposed in an array extended in the direction in which the recording paper 2 is fed, this direction designated sub-scanning direction, and in each ink path connecting to each corresponding orifice, installed is a heater for generating thermal energy used for ejecting ink droplets. The heater generates thermal energy in responsive to electric pulses correlated with driving signal data, and film boiling occurs in the ink fluids which leads to generating a bubble due to film boiling and finally to ejection of ink droplets from the orifice. In this embodiment, the frequency of heater driving signals, that is, the ejection frequency, is 2 KHz.

A carriage 4 includes the recording head 1, and is supported by a couple of guide shafts 5A and 5B so as to move freely along the guide shafts 5A and 5B. The carriage 4 is fixed on a belt expanded by pulleys and the carriage 4 is moved by rotational movements of pulleys driven by the motor 202 linked with the pulleys. Ink fluids supplied to each of the recording heads 1C, 1M, 1Y and 1K are stored in an ink cartridge not shown which is separately formed for each individual ink color fluid installed in the carriage 4. An individual ink fluid is supplied to each of the recording heads through an ink supply route not shown. Flexible electric cables 7C, 7M, 7Y and 7K are connected to their corresponding recording heads 1C, 1M, 1Y and 1K, through which driving signals corresponding to recording data and control signals are supplied from the control board 15 of the recording apparatus to the head driving circuit (head driver) placed in the recording head.

The longer side of the sheet feeding rollers 3A and 3B is extended in parallel to the guide shafts 5A and 5B and the sheet feeding rollers 3A and 3B are driven by a sheet feeding motor 204 and used for feeding a recording sheet 2 as recording medium and for establishing a recording face on the recording sheet 2. Sheet feeding rollers 6A and 6B are placed below the sheet feeding rollers 3A and 3B, and rotate as the recording sheet 2 is fed in order to establish a flat recording face on the recording sheet between rollers 3(A, B) and 6(A, B). In the above described structure, the recording heads 1C, 1M, 1Y and 1K eject ink droplets on the recording face of the recording sheet 2 in front of the orifices of the recording head 1.

Figure 28:
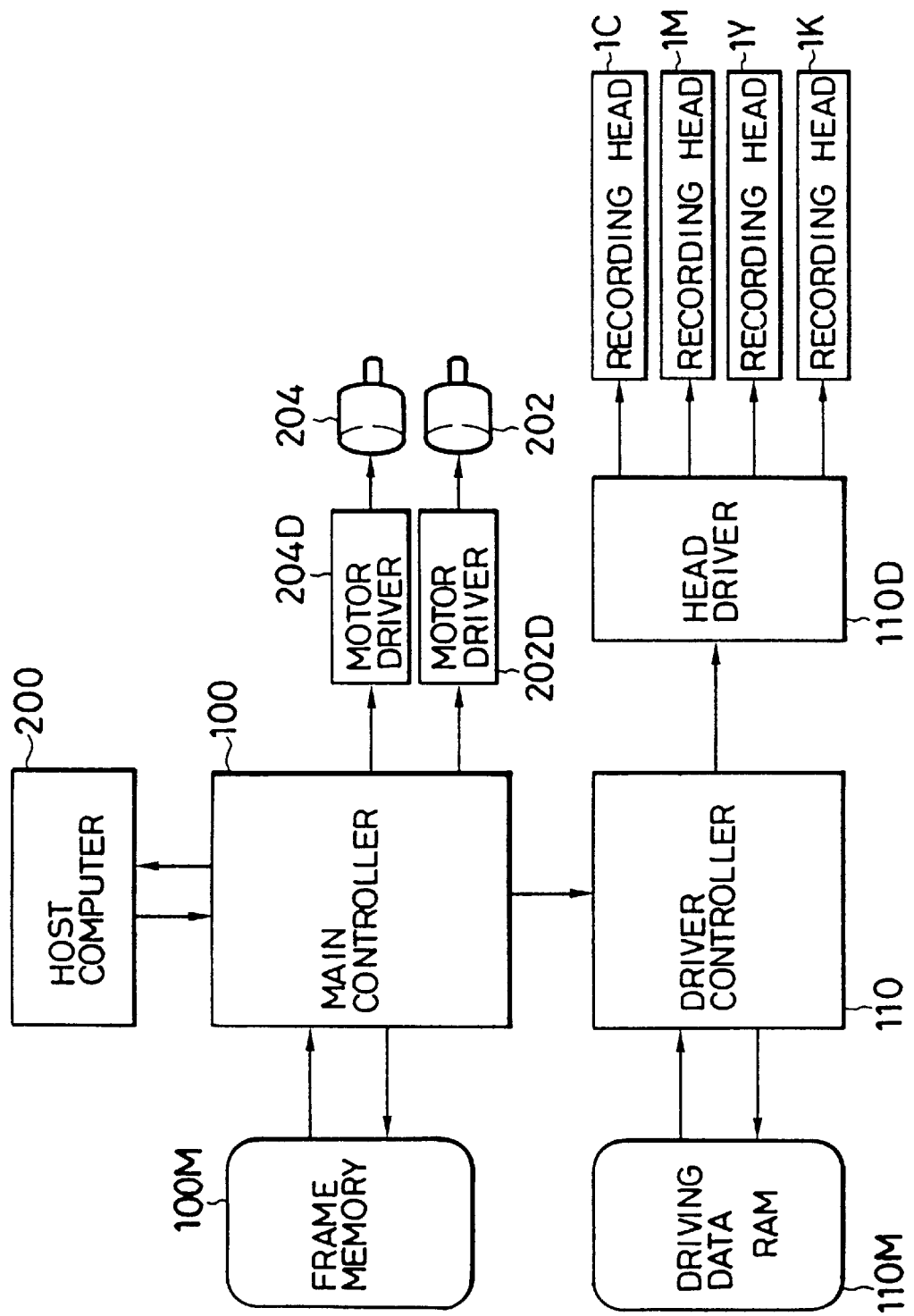
FIG. 28 is a block diagram showing a control structure of the apparatus shown in FIG. 27.

FIG. 28 is a block diagram showing a control structure of the ink jet recording apparatus shown in FIG. 27, which is similar to the structure shown in FIG. 4.

A main controller 100 is composed of CPU and so on, and transfers image data supplied from the host computer 200 into pixel data with gray scale conversion and store pixel data into the frame memory 100M. The main controller 100 supplies gray-scaled pixel data stored in the frame memory 100M to the driver controller 110 at predetermined timings. As described later with FIG. 29 and so on, the driver controller 110 transfers halftoning pixel data supplied from the frame memory 100M to drive data which describes turn-on and turn-off signals to each heater of the recording heads 1C, 1M, 1Y and 1K, and these signals are specified by referring a combination of the orifice index number and the scanning number. The orifice number is the order of the orifice array in the recording head and the scanning number is the sequential number of main-scanning operations. The converted halftoning pixel data in the driver controller 110 are stored in the driving data RAM 110. The driver controller 110 read out the drive data stored in the driving data RAM 110M by referring their orifice number and scanning number in responsive to control signals from the main controller 100, and supplies the read-out driving data into the head driver 110D and controls its driving timing.

In the above described structure, the main controller 110 controls the ink ejection by the recording head 1 and the rotational movements of the carriage driving motor 202 and the sheet feeding motor 204 through the driver controller 110, the motor driver 204D and the motor driver 202D. So far, characters and graphic images are recorded on the recording sheet 2 in responsive to input image data.

Figure 29:
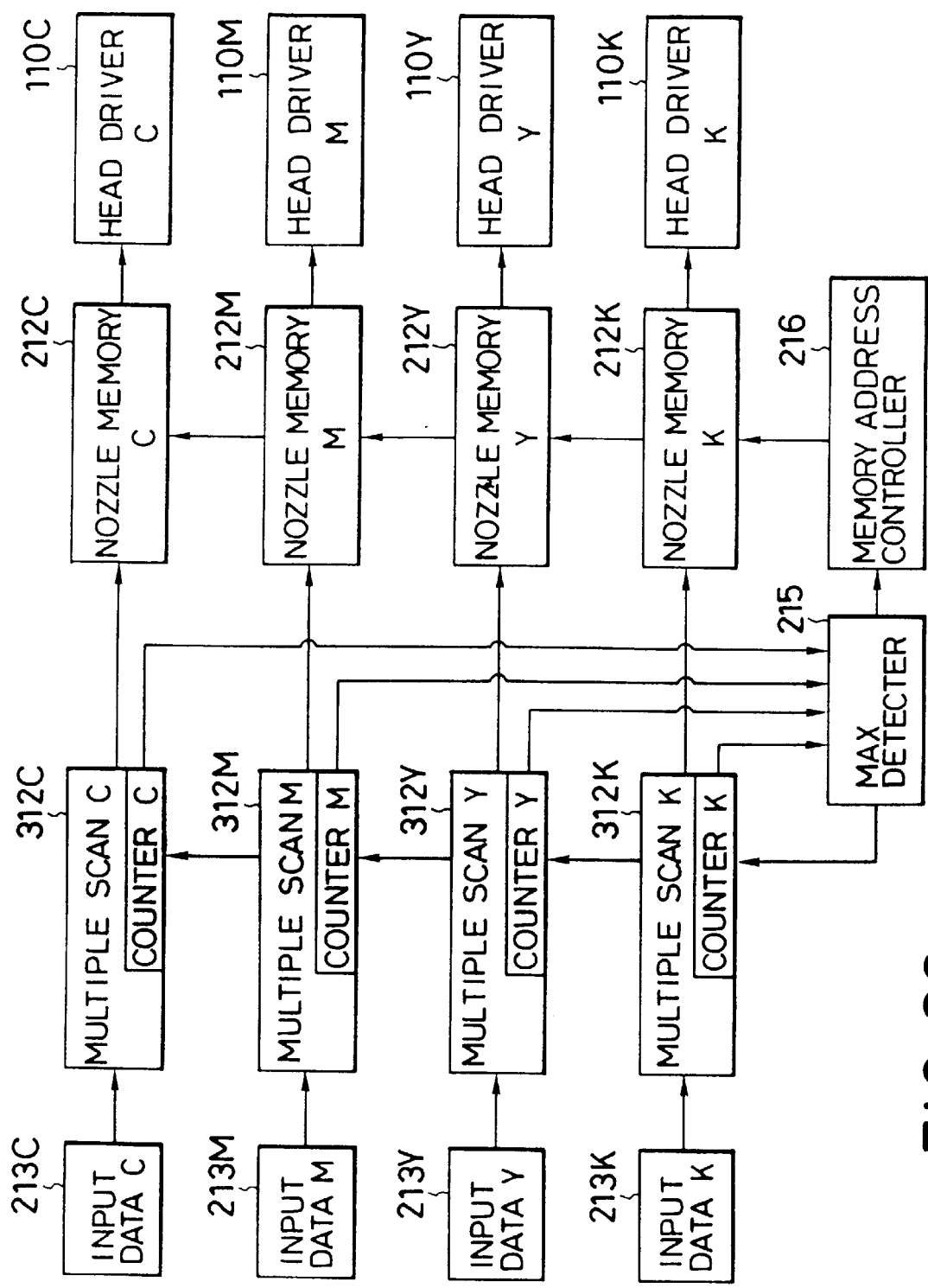
FIG. 29 is a block diagram showing one embodiment of the structure in the driver controller shown in FIG. 28.

FIG. 29 is a block diagram showing a structure included in the driver controller 110 shown in FIG. 28. With this structure, what is determined whether each of the recording heads ejecting individual ink fluids of cyan, magenta, yellow or black colors can eject an ink droplet or not.

In FIG. 29, reference numeral 213C denotes an input signal defining the density level with respect to a single pixel to which a cyan ink fluid is ejected by ejection from the recording head 1C, that is, the number of ink droplets forming a single pixel. In this embodiment, this signal is the output from the 5-level pseudo-halftoning processing part having and values between 0 and 4. Reference numerals 213M, 213Y and 213K denote input signals corresponding to magenta, yellow and black ink fluids, respectively. Reference numeral 312C denotes a multiple scan circuit for judging the value defined by the input signal 213C and for determining whether designated orifices should eject an ink droplet or not. The multiple scan 312C contains a 2-bit counter. Similar to the multiple scan 312C, reference numerals 312M, 312Y and 312K are multiple scan circuits for determining whether their designated orifices corresponding to magenta, yellow and black ink fluids, respectively, should eject an ink droplet or not, and each of them also contains a 2-bit counter.

Reference numeral 212C denotes a nozzle memory for storing data defined in the multi scan 312C for determining whether designated orifices should eject an ink droplet or not. The nozzle memory 212C has a 4-bit segment corresponding to 4 orifices per single pixel. Similar to the nozzle memory 212C, blocks 212M, 212Y and 212K represent nozzle memories storing data determining whether designated orifice corresponding to magenta, yellow and black ink fluids, respectively, should eject an ink droplet or not. These nozzle memories may be also defined on the driving data RAM 110M shown in FIG. 28.

Reference numeral 110C denotes a head driver for driving a heater in each of orifices in responsive to the signal from the nozzle memory 212C. Similar to the head driver 110C, blocks 110M, 110Y and 110K represent head drivers for driving heaters in orifices corresponding to magenta, yellow and black ink fluids.

Reference numeral 215 denotes a max detector for detecting the maximum value of the counted numbers at the 2-bit counters of the multiple scans 312C, 312M, 312Y and 312K. The output from the max detector 215 is a 2-bit signal and its value is defined to be between 0 and 3 and is necessarily less than 4. Reference numeral 216 denotes a memory address controller for selecting one nozzle memory from nozzle memories 212C, 212M, 212Y and 212K. That is the memory address controller 216 determines one orifice from four orifices to be used for forming a designated pixel according the maximum value from the Max detector 215.

Figure 1:
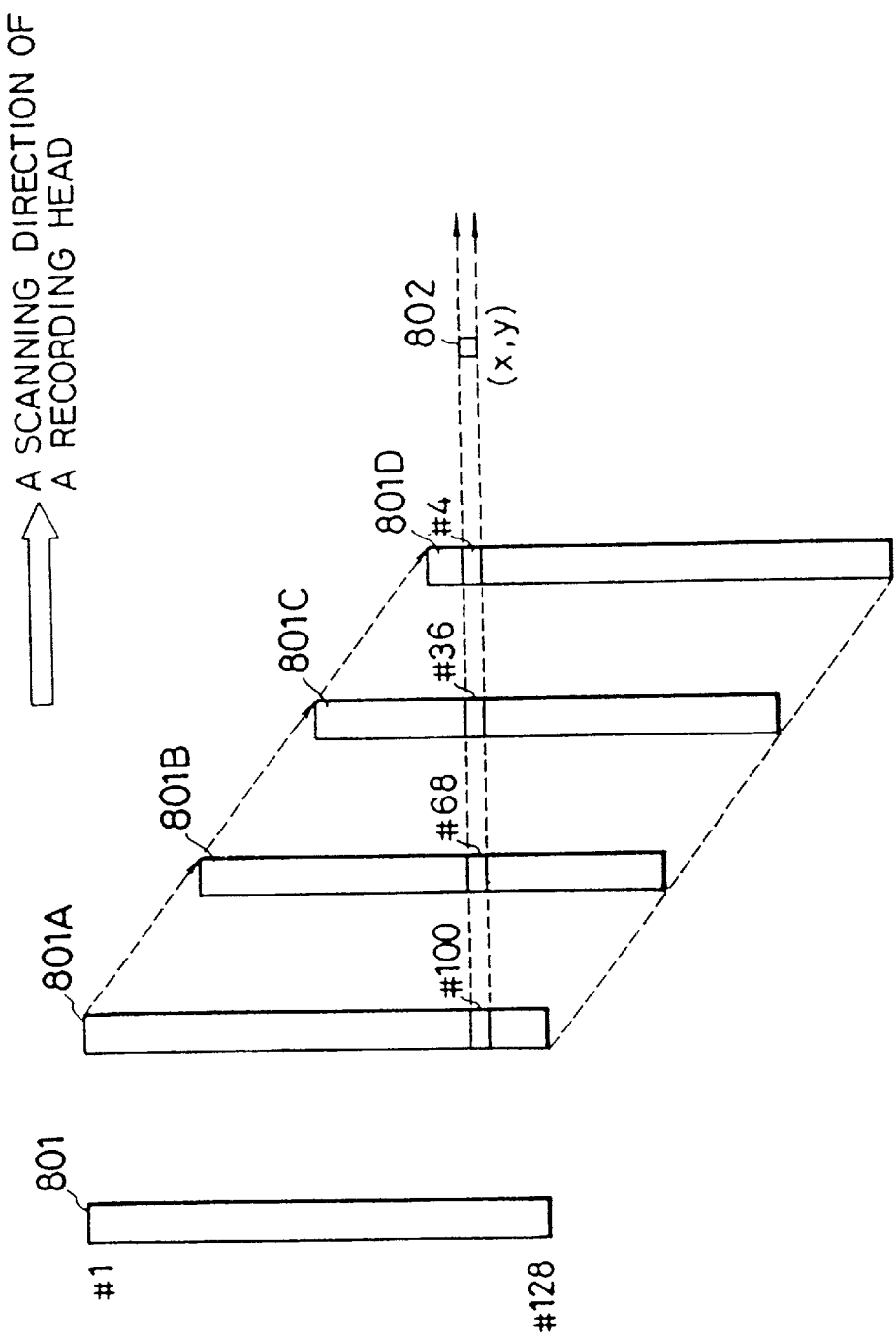
FIG. 1 is a schematic illustration illustrating a method for forming a single pixel with a plurality of ink droplets ejected from individually different orifices in different scanning.

In the following, what is explained about procedures in the above described structure in the case that a pixel is formed by 4 scannings using orifices No. 100, No. 68, No. 38 and No. 4 shown in FIG. 1.

In the case of ejecting cyan ink droplets, the multiple scan 312C selects one of orifices No. 100, No. 68, No. 36 or No. 4 to be used for ejection, in responsive to the input signal 213 having an integer value between 0 and 4. For example, in the case that the value of the input signal 213C is 2, that is, a pixel is formed with two ink droplets, the multiple scan 312C assigns "1" into the addresses corresponding to orifices No. 100 and No. 68, in the nozzle memory 212C, and assigns "0" into the addresses corresponding to orifices No. 36 and No. 4 in the nozzle memory 212C. The head driver 110C reads data stored in the nozzle memory 212C and drives the heater of designated orifices according to the stored data.

These procedures are similarly applied to ejecting magenta, yellow and black ink fluids, and ink droplets are ejected from each of recording heads.

The selection of orifices from which ink droplets are ejected is based on the orifice number which is determined by the MAX detector 215 and by which the first ink droplet in each pixel is ejected, and on the value of each input signal. In the following, details of the selection of orifices will be described.

At the beginning of the selection of orifices of each pixel, the values of counters of the multiple scan 312C to 312K are all set to be 0 and also the initial value of the MAX detector 215 is 0. At this time, the MAX detector 215 sends "0" to the memory address controller 216. As a result, the memory address controller 216 directs memory addresses according to the value 0 from the max detector 215 in the nozzle memories 212C, 212M, 212Y and 212K so that the set memory addresses correspond to the orifice No. 100. Receiving input signals 213C, 213M, 213Y and 213K and judging their values to be other than "0", if the values is other than 0, the multiple scans 312C, 312M, 312Y and 312K output "1" to their corresponding nozzle memories 212Y, 212M, 212Y and 212K. As a designated addresses corresponding to the orifice No. 100 is directed by the memory address controller in each of the nozzle memories, the content of the memories directing the orifice No. 100 becomes "1". At the same time, new input values are defined by subtracting 1 from old input values, and every counters in the multi scans are incremented. If an input value is 0, the multi scans 321C, 312M, 312Y and 312K output "0" to the nozzle memories and their corresponding counters are not incremented.

Next, the memory address controller 216 directs the addresses corresponding to the orifice No. 68 in each nozzle memories. If each of the multi scans 312C, 312M, 312Y and 312K judges individually that the values obtained by subtracting 1 from the each of input signals are other than 0, each of them outputs "1" individually to their respective nozzle memories 212C, 212M, 212Y and 212K, and the counter of each of the multi scans is individually incremented. Owing to the processing regarding orifice No. 68 the value, in the case that each input value is not 0, "1" is stored in each nozzle memory for the orifice No. 68, and in the case that each input value is 0, the value "0" is stored in each nozzle memory for the orifice No. 68. Similarly, the new input values are obtained by subtracting 1 from the previous input values.

In the similar manner, the above procedures are repeated four times for forming a single pixel, and what is determined is whether each of the orifices No. 100, No. 68, No. 36 and No. 4 is used or not used for ejecting an ink droplet.

Next, the next pixel adjacent to the pixel of the above procedures, in the scanning direction of the recording head, is processed. At first, the MAX detector 215 reads the value of each counter of the multi scans 312C, 312M, 312Y and 312K, and determines the maximum value among them, and than, all the counters in the multi scans are set back to "0". The MAX detector 215 sends the detected maximum value to the memory address controller 216, and the memory address controller 216 judges this value and selects one of the nozzle memories of each ink color. At this time, if the detected value at the MAX detector 215 is 0, selected is the nozzle memory corresponding to the orifice No. 100. If the detected value at the MAX detector 215 is 1, selected is the nozzle memory corresponding to the orifice No. 68. If the detected value at the MAX detector 215 is 2, selected is the nozzle memory corresponding to the orifice No. 36. If the detected value at the MAX detector 215 is 3, selected is the nozzle memory corresponding to the orifice No. 4.

As a result, for example, in case that two ink droplets with single colored ink fluids are ejected to the previous pixel in the scanning direction of the recording head, and the maximum number of ejections of individual colored ink fluids is 2, then the detected value at the MAX detector 215 is 2, and hence, the memory address controller 216 selects the memory corresponding to the orifice No. 36 with respect to all the nozzle memories 212C, 212M, 212Y and 212K.

The above described procedures are repeated with respect to individual ink colors and their corresponding input values of recording images, and so far, either of "1" or "0" is assigned to each of the nozzle memories and what is determined is whether or not individual orifices are used for ejecting an ink droplet.

With the above structure, the orifices assigned at the first ejection of each colored ink fluid in each pixel are used in identical scanning with each other, that is, eject ink droplets on an identical position in each pixel.

FIGS. 30A to 30D are schematic illustrations showing dot patterns developed in a single pixel by procedures in the structure shown in FIG. 29.

Figure 30A:
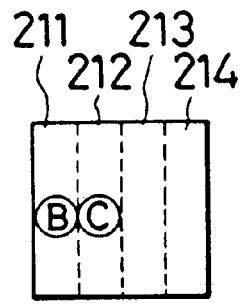
FIGS. 30A, 30B, 30C and 30D are schematic illustrations showing examples of ink dot patterns on a pixel by the structure shown in FIG. 29.
Figure 30B:
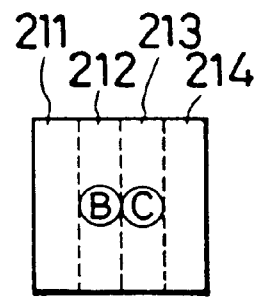
Figure 30C:
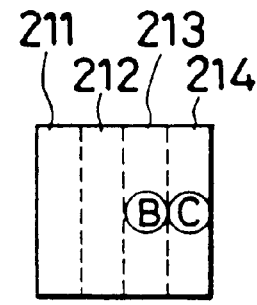
Figure 30D:
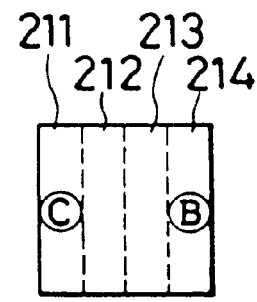

In FIGS. 30A to 30D, reference numeral 211 denotes an area to which an ink droplet is ejected in the pixel by the ejection from the orifice No. 100, that is, in the first scanning of the recording head, reference numeral 212 denotes an area to which an ink droplet is ejected in the pixel by the ejection from the orifice No. 68, that is, in the second scanning of the recording head, reference numeral 213 denotes an area to which an ink droplet is ejected in the pixel by the ejection from the orifice No 36, that is, in the third scanning of the recording head, and reference numeral 214 denotes an area to which an ink droplet is ejected in the pixel by the ejection from the orifice No. 4, that is, in the fourth scanning of the recording head. Therefore, FIG. 30A shows that a pixel is formed with two cyan ink droplets ejected from the orifice No. 100 and No. 68 and a magenta ink droplet ejected from the orifice No. 100. FIG. 30B shows that a pixel is formed with two cyan ink droplets ejected from the orifice No. 68 and No. 36 and a magenta ink droplet ejected from the orifice No. 68. FIG. 30C shows that a pixel is formed with two cyan ink droplets ejected from the orifice No. 36 and No. 4 and a magenta ink droplet ejected from orifice No. 36. FIG. 30D shows that a pixel is formed with two cyan ink droplets ejected from the orifice No. 4 and No. 100 and a magenta ink droplet ejected from the orifice No. 4.

In the case of forming a pixel with two cyan ink droplets and a magenta ink droplet, the number of feasible dot patterns considered without any constraint is 16 as shown in FIG. 26. According to the structure shown in FIG. 29, in forming each pixel with any ink color fluid, the scannings in which the first orifice is assigned to eject an ink droplet is common to every case in using different ink color fluids. That means that the orifice with an identical orifice number is assigned at first to ejection of each of different color ink droplet in each pixel and after that, orifices are selected sequentially. Owing to this constraint, the actual number of restricted dot patterns is 4 as shown in FIG. 30A to 30D. For example, if the orifice number of the orifice used at first for forming a designated pixel is No. 36, the developed dot pattern in the pixel is the pattern shown in FIG. 30C.

So far, for example, in the case of forming a pixel with two cyan ink droplets and a single magenta ink droplet, as the dot pattern developed in the pixel is always either of patterns shown in FIGS. 30A to 30D, the number of feasible dot patterns can be reduced. Owing to this situation, it will appreciated that the change of colorness of the pixel due to a pattern change can be reduced.

As found to be apparent from the structure shown in FIG. 29, the reduction of the number of feasible dot patterns can be established in any case of using the arbitrary kind and number of colored ink fluids, and therefore, the difference of colorness between pixels formed with an identical number of ink droplets composed of an identical kind of ink fluid can be extremely minimized.

In FIG. 29, even if the output value defined by adding the maximum value detected by the MAX detector 215 to the maximum value used in forming the previous pixel adjacent back to the present pixel is supplied to the memory address controller 216, the developed dot pattern becomes either of patterns shown in FIGS. 30A to 30D. That is, as far as the combination and the number of colored ink fluids do not change, designated mixed and gray-scaled color images can be obtained stably.

The above described Embodiment 4 is effective especially in the case that a part included in the image to be recorded and occupying a designated area or the whole image is composed of a monotonic color.

For example, in the case of recording the whole image or a part of it, occupying a certain area, with a light tone of blue, as described above, each pixel is formed with two cyan ink droplets and a single magenta ink droplet. In this case, according to Embodiment 4, its developed pattern in the pixel is principally to be either of patterns shown in FIGS. 30A to 30D. In the case that a series of pixels, each composed of two cyan ink droplets and a single magenta ink droplet are continuously adjacent to one another, the maximum value detected by the MAX detector 215 in FIG. 29 is always 2. As a result, the orifice number of orifices assigned at first to ejecting each colored ink fluids for each pixel is commonly No. 36, and each pixel has an identical dot pattern shown in FIG. 30C.

In addition, in FIG. 29, if the output value defined by adding the maximum value detected by the MAX detector 215 to the maximum value used in forming previous pixel adjacent back to the present pixel is supplied to the memory address controller 216, pixels with dot patterns shown in FIGS. 30A and 30C are alternately repeated, and hence, the overall image is obtained so as to have identical color.

So far, in recording an image composed of a single color, the change of colorness of the pixel due to a pattern change can be completely eliminated, and hence it will be appreciated that a high-quality recorded imaged can be obtained.

Embodiment 4A

Figure 31:
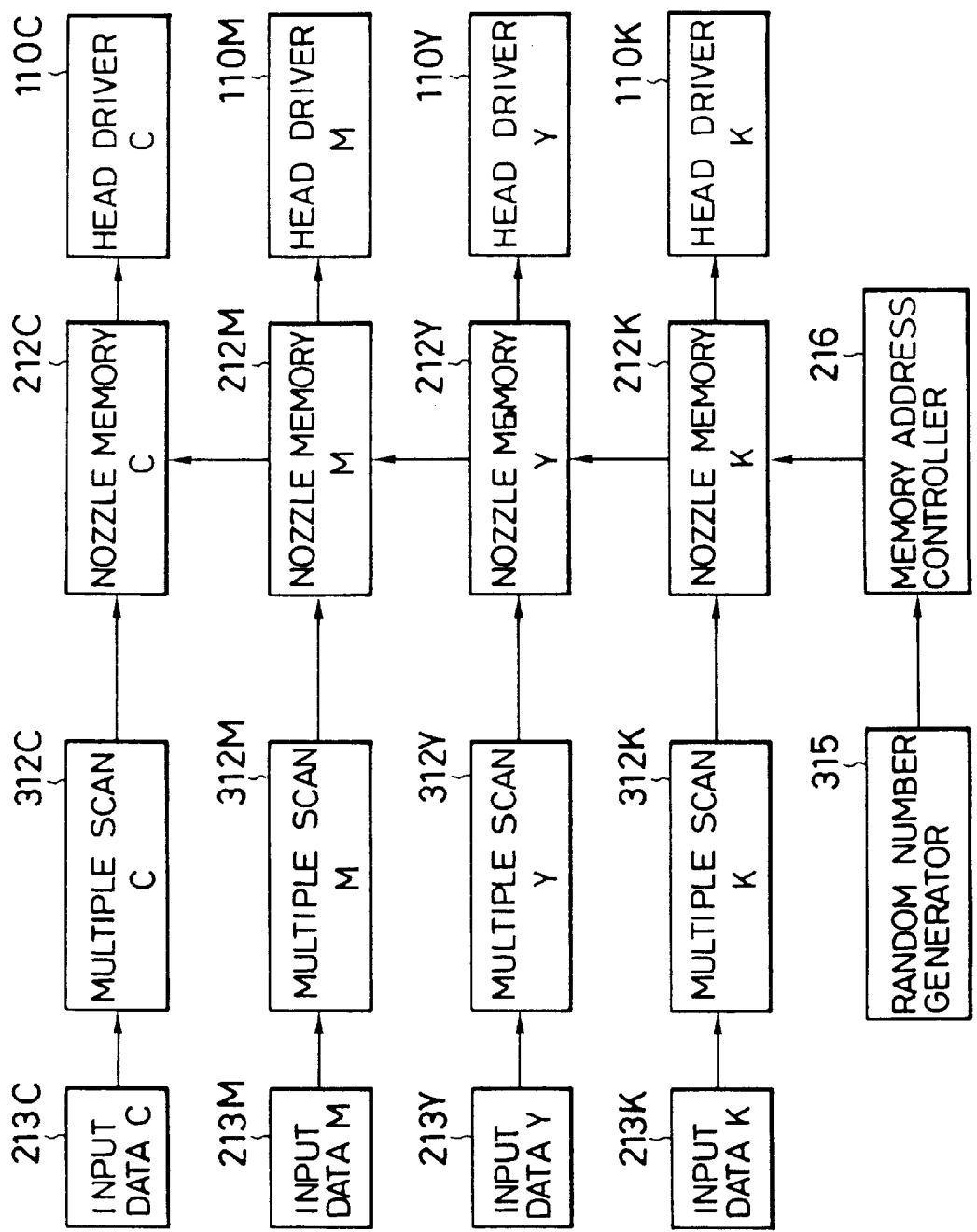
FIG. 31 is a block diagram showing another embodiment of the structure in the driver controller shown in FIG. 28.

FIG. 31 is a block diagram showing a structure of Embodiment 4A similar to that of Embodiment 4 shown in FIG. 29. Similar to Embodiment 4 shown in FIG. 29, the structure of this embodiment is for determining whether or not each of orifices used for ejecting cyan, magenta, yellow and black ink fluids is used an actual ejection. In FIG. 31, like numerals are assigned to like parts having a similar function to that in FIG. 29, and details of them are abbreviated. In this embodiment, each of the multi scan does not have a counter.

In FIG. 31, reference numeral 315 denotes a random number generator for generating numbers between 0 and 3 randomly, and its output with values between 0 and 3 is supplied to the memory address controller 216 similarly to the MAX detector 215 shown in FIG. 29. The memory address controller 216 selects one of the addresses, each corresponding to each of orifices No. 100, No. 68, No. 36 and No. 4 from nozzle memories 212C, 212M, 212Y and 212K in responsive to the output value between 0 and 3 supplied from the random number generator 315.

Owing to this structure, dot patterns shown in FIGS. 30A to 30D are selected randomly and developed in pixels. Therefor, the difference of colorness between pixels formed with an identical number of ink droplets composed of an identical kind of ink fluid can be extremely minimized, and hence, it will be appreciated that a desirable high-quality recorded image can be obtained. In addition, also in this structure, there is such an advantage that all the orifices are used for ejection uniformly and specific orifices are not occupied for ejection.

In the above embodiments 4 and 4A, the order of developed dots composed of different color ink fluids is determined by the mechanical layout of the recording heads for ejecting different color ink fluids. However, the orders is determined according to the colorness and the reproducibility of recorded images, and in this invention, this order does not change the above described effects brought by this invention.

In addition, in the embodiments 4 and 4A, in forming single pixel composed a plurality of dots formed by a plurality of colored ink droplets ejected from individual orifices corresponding to individual ink colors, the recording head is scanned plural times to alter orifices for ejecting ink droplets. However, this invention is not limited to this structure, but applicable to such a structure that a single pixel is formed by ejecting a plurality of ink droplets from a plurality of orifices continuously arranged in an array geometry in the recording head.

Figure 32:
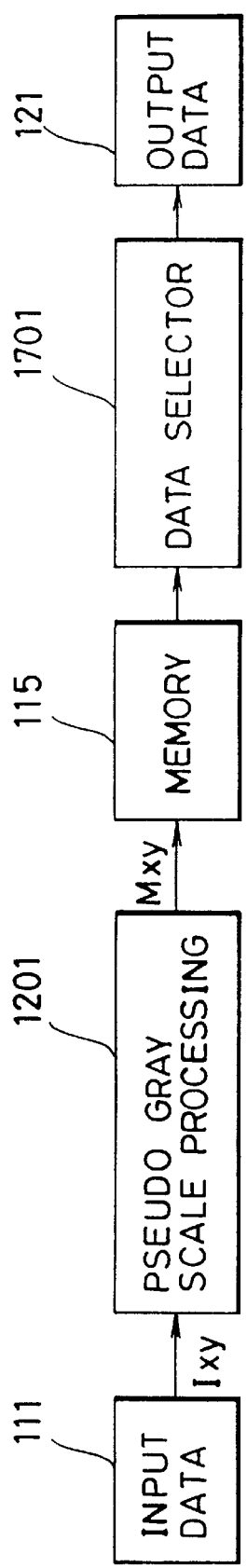
FIG. 32 is a block diagram showing a structure for image processing for recording the image shown in FIG. 17.
Figure 33:
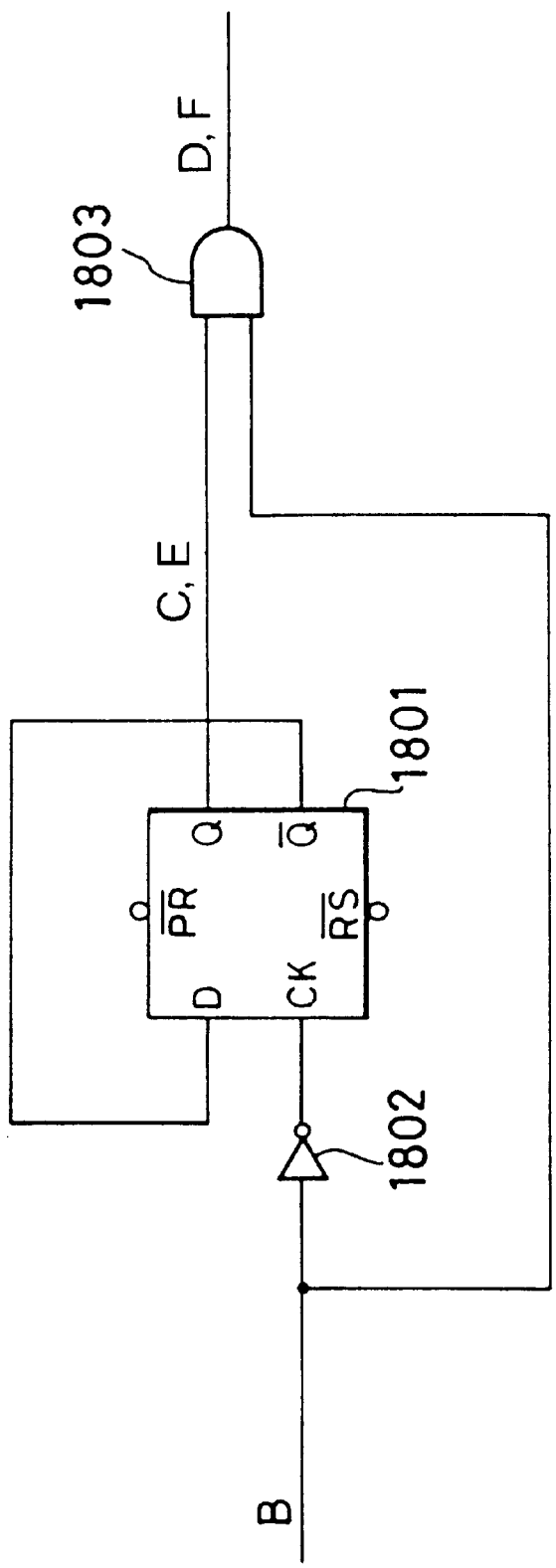
FIG. 33 is a circuit diagram showing a detail of a data selector shown in FIG. 32.
Figure 34:
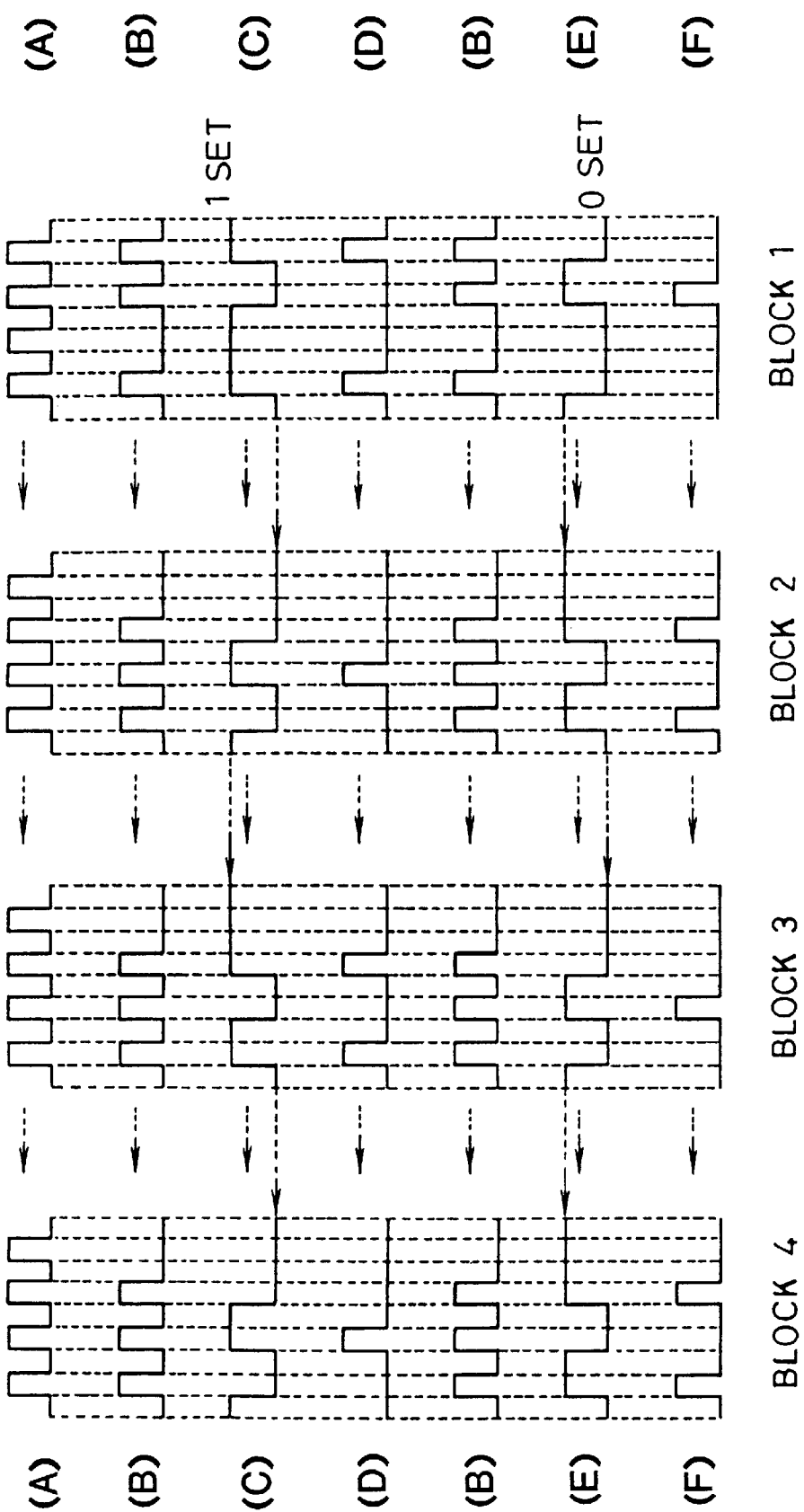
FIG. 34 is a timing chart showing a timing of signals in a circuit shown in FIG. 33.
Figure 35A:
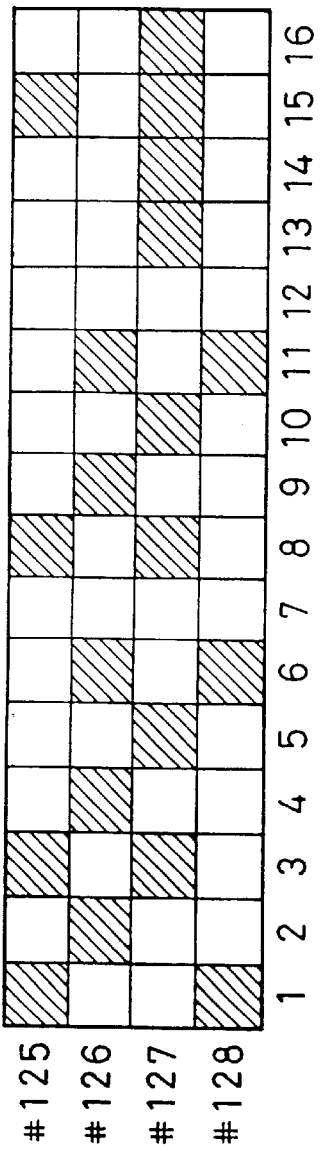
FIGS. 35A and 35B are schematic illustrations of data used in a recording operation illustrated in FIG. 13
Figure 35B:
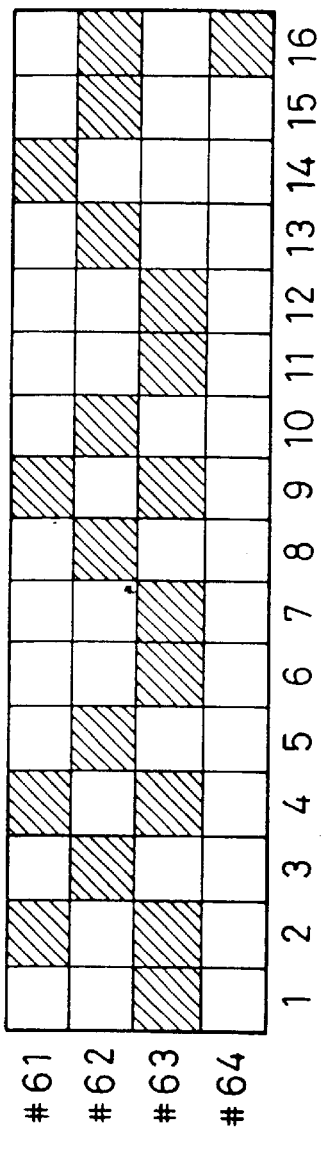
Figure 35C:
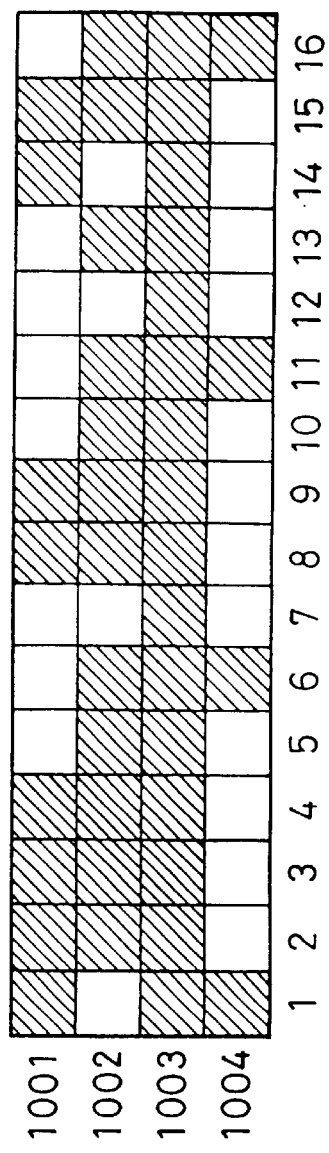
FIG. 35C is a schematic illustration of a result of the recording operation.

FIG. 32 is a block diagram showing the structure for forming an image of FIG. 17, FIG. 32, reference numeral 1701 denotes a data selector for determining which data from a memory 115 are output during each scanning of the recording head, and the details of the data selector is shown in FIG. 33. In FIG. 33, reference numeral 1801 denotes a flip flop, and 1803 an AND gate. FIG. 34 is a time chart illustrating timing chart of various signals of the data selector 1701 (see FIG. 33). FIG. 35 illustrates which one of twice scanning of the recording head forms the image of the present embodiment.

Referring to the drawings, there will be explained in order. In FIG. 32, the data selector circuit 1701 determines how to transfer data from a memory 115 to an output data 121 during each scanning of the recording head. The circuit of the data selector 1701 is shown in details in FIG. 33. In FIG. 34, symbols (B) (C1) (C2) (D1) and (D2) designate timing signals of B, C1, C2, D1 and D2, respectively in FIG. 33. FIGS. 35A and 35B illustrate data for recording during scannings 401A and 401B of FIG. 13, respectively.

In the above structure, an output Mxy from a pseudo-halftoning processing 1201 of FIG. 32 takes a value "0" or "1", the value of the output Mxy is stored in a position of the memory 115 corresponding to each pixel. Here, FIG. 17 illustrates recording data itself stored in the memory 115. These data must be assigned to any of orifices #1 through #64 or orifices #65 through #128. In the present embodiment, for example, there will be shown how orifices #61 through #64 and orifices #125 through #128 are assigned to any of scannings 401A and 401B. In explanation, orifices #1 through #60 and orifices #65 through #124 are abbreviated. First, in the Scanning 401A, all the data in the memory 115 are read out, and output to the data selector 1701, which produces data to be assigned to orifices #125 through orifice #128, and transfers them to the output data 121. Also in the subsequent scanning 401B, all the data in the memory 115 are read out, and output to the data selector 1701 in a similar manner, which produces data to be assigned to orifices #61 through orifices #64, and transfers them to the output data 121.

Next, referring to FIGS. 33 and 34, there will be described the processing of the data selector 1701. In FIG. 34, the signal (A) is a transfer clock. The data in the memory 115 are read out, data of each pixel are supplied to the circuit shown in FIG. 33, and the processed data from the data selector are transferred to the recording head according to the transfer clock (A). The signal (B) of FIG. 34 is data read out from the memory 115, and accords with that of FIG. 17. These data is applied to one of input terminals of an AND gate 1803, while the inverted data of signal (B) are input to a CK terminal of the flip-flop 1801. Because a D terminal of the flip-flop 1801 is connected to a Q terminal thereof, the data input the D terminal of the flop-flop 1801 can be inverted according to the data from the memory 115. In FIG. 34, the signal (C) and (E) are outputs of the flop-flop 1801. The signal (C) is preset to "1" such as by CPU (not shown) before the scanning 401A starts. The signal (E) is similarly set to "0" at the beginning of the scanning 401B. Data of other pixels not shown all is "0" for clarity of explanation, abbreviation parts shown in dotted lines in signals (C) and (E) is maintained in a shown state in FIG. 34. These output signals (C) and (E) are input to the other terminal of the AND gate 1803. Both signals (D) and (F) of FIG. 34 are output signals of the data selector 1701. The signal (D) is an AND output between the signal (B) from the memory 115 and the signal (C), and the signal (F) is an AND output between the signal (B) from the memory 115 and the signal (C). FIG. 35 illustrates the outputs of the data selector 1701 constructed as described above. FIG. 35A illustrates data supplied during the scanning 401A, and FIG. 35B illustrates data supplied in the scanning 401B.

As described above, the present embodiment is constructed such that orifices to be used is determined in a direction of orifices line of the recording head according to image data. Accordingly, the capacity of memory can be reduced to half that in the prior art, and the number of hardware can be decreased greatly.

The present invention achieves distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, as an output device of a facsimile apparatus having a transmission and receiving function, and as an output device of an optical disc apparatus for recording and/or reproducing information into and/or from an optical disc.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet printing apparatus for scanning a printing medium a plurality of times with a printing head having a plurality of discharging portions to form a line of pixels extending in a scanning direction of the printing head, said apparatus comprising:

data assigning means for assigning driving data for the line of pixels to be formed by the plurality of times of scanning, said data assigning means assigning the driving data for each of the plurality of times of scanning, plural memories provided in correspondence to each of the plurality of times of scanning so as to store the driving data assigned to said each of the plurality of times of scanning; and driving means for causing the printing head to discharge ink during each of the plurality of times of scanning, based on driving data assigned to said each scanning, wherein said data assigning means, for each of the driving data for the line of pixels to be formed by the plurality of times of scanning, repeats selecting one of said plurality of memories by means of a pointer and storing the driving data in the selected memory, so as to assign the driving data for the line of pixels to the plurality of times of scanning.

2. An ink jet printing apparatus as claimed in claim 1, wherein different discharging portions are used between the plurality of times of scanning for forming the line of pixels, and said data assigning means sequentially assigns the driving data for one pixel in the line so that the different discharging portions are sequentially used in the plurality of times of scanning for forming the one pixel.

3. An ink jet recording apparatus as claimed in claim 2, wherein said data assigning means assigns said plurality of driving data to said plurality of individually different discharging portions in a predetermined order, and the discharging portion assigned at first to each of said pixels is different from one of said pixels to another of said pixels.

4. An ink jet recording apparatus as claimed in claim 3, wherein said discharging portion assigned at first is one next to the discharging portion assigned in the previous data setting of the pixel in said predetermined order.

5. An ink jet recording apparatus as claimed in claim 4, wherein said predetermined order is a sequential order of said plurality of individually different discharging portions, and said discharging portion assigned at first is determined in accordance with a position of a corresponding pixel in said set of pixels.

6. An ink jet recording apparatus as claimed in claim 3, wherein said predetermined order is a sequential order of said plurality of individually different discharging portions, and said discharging portion assigned at first is determined randomly.

7. An ink jet recording apparatus for scanning a recording head having a plurality of discharging portions, from which ink is ejected, on a recording medium and ejecting the ink from the recording head to the recording medium to form a line of pixels extending in a scanning direction of the recording head, said apparatus comprising:

driving means for making said recording head eject the ink droplet according to driving data; and data assigning means for assigning the driving data corresponding to the line of pixels to each of different discharging portions, which eject the ink of the same color and are used for forming said line of pixels, so as to form each one pixel of said line of pixels by means of one discharging portion, wherein said data assigning means sequentially assigns the driving data to the different discharging portions so that said different discharging portions are sequentially used when forming the line of pixels.

8. An ink jet recording apparatus as claimed in claim 7, wherein said ink jet recording apparatus further comprises a scanning means for performing a scanning operation of said recording head, and said one of said plurality of discharging portions ejects the ink droplet in respective different scanning of said recording head.

9. An ink jet recording apparatus as claimed in claim 8, wherein said recording head generates a bubble in an ink fluid by thermal energy and ejects the ink droplet in responsive to generation of said bubble.

10. An ink jet recording apparatus as claimed in claim 9, wherein said one of said plurality of discharging portions is different from one of said pixels to another of said pixels in the direction of said scanning of said recording head.

11. An ink jet printing method of scanning a printing medium a plurality of times with a printing head having a plurality of discharging portions to form a line of pixels extending in a scanning direction of the printing head, said method comprising the steps of:

assigning driving data for the line of pixels to be formed by the plurality of times of scanning the driving data being assigned for each of the plurality of times of scanning;

providing plural memories in correspondence to each of the plurality of times of scanning so as to store the driving data assigned to said each of the plurality of times of scanning; and driving the printing head to discharge ink during each of the plurality of times of scanning, based on driving data assigned to said each scanning, wherein said assigning step, for each of the driving data for the line of pixels to be formed by the plurality of times of scanning, repeats selecting one of said plurality of memories by means of a pointer and storing the driving data in the selected memory, so as to assign the driving data for the line of pixels to the plurality of times of scanning.

12. An ink jet printing method as claimed in claim 11, wherein different discharging portions are used between the plurality of times of scanning for forming the line of pixels and said data assigning means sequentially assigns the driving data for one pixel in the line so that the different discharging portions are sequentially used in the plurality of times of scanning for forming the one pixel.

13. An ink jet recording method as claimed in claim 12, wherein said assigning step assigns said driving data to said plurality of individually different discharging portions in a predetermined order, and the discharging portion assigned at first to each of said pixels is different from one of said pixels to another of said pixels.

14. An ink jet recording method as claimed in claim 13, wherein said discharging portion assigned at first is one next to the discharging portion assigned in the previous data setting of the pixel in said predetermined order.

15. An ink jet recording method as claimed in claim 14, wherein said predetermined order is a sequential order of said plurality of individually different discharging portions, and said discharging portion assigned at first is determined in accordance with a position of a corresponding pixel in said set of pixels.

16. An ink jet recording method as claimed in claim 13, wherein said predetermined order is a sequential order of said plurality of individually different discharging portions, and said discharging portion assigned at first is determined randomly.

17. An ink jet recording method of scanning a recording head having a plurality of discharging portions, from each of which ink is ejected, on a recording medium and ejecting the ink to the recording medium to be capable of forming a line of pixels extending in a scanning direction of the recording head, said method comprising the steps of:

assigning the driving data corresponding to the line of pixels to each of different discharging portions, which eject the ink of the same color and are used for forming said line of pixels, so as to form each one pixel of said line of pixels by means of one discharging portion; and driving the different discharging portions to eject the ink based on the driving data assigned in said data assigning step to form the line of pixels, wherein said data assigning step sequentially assigns the driving data to the different discharging portions so that said different discharging portions are sequentially used when forming the line of pixels.

* * * * *